US010834755B2

(12) United States Patent
Chen et al.

(10) Patent No.: US 10,834,755 B2
(45) Date of Patent: Nov. 10, 2020

(54) PHYSICAL LAYER SHORT FEEDBACK

(71) Applicant: Intel IP Corporation, Santa Clara, CA (US)

(72) Inventors: Xiaogang Chen, Portland, OR (US); Qinghua Li, San Ramon, CA (US); Laurent Cariou, Portland, OR (US); Feng Jiang, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/322,088

(22) PCT Filed: Sep. 29, 2017

(86) PCT No.: PCT/US2017/054336
§ 371 (c)(1),
(2) Date: Jan. 30, 2019

(87) PCT Pub. No.: WO2018/071205
PCT Pub. Date: Apr. 19, 2018

(65) Prior Publication Data
US 2019/0190752 A1    Jun. 20, 2019

Related U.S. Application Data

(60) Provisional application No. 62/487,225, filed on Apr. 19, 2017, provisional application No. 62/406,771, filed on Oct. 11, 2016.

(51) Int. Cl.
*H04B 7/06* (2006.01)
*H04J 11/00* (2006.01)
(Continued)

(52) U.S. Cl.
CPC .......... *H04W 74/06* (2013.01); *H04B 7/0643* (2013.01); *H04L 5/001* (2013.01);
(Continued)

(58) Field of Classification Search
CPC ........ H04B 7/06–0697; H04J 2011/0003–002; H04L 5/0001–0098; H04L 27/0008;
(Continued)

(56) References Cited

U.S. PATENT DOCUMENTS

2011/0222521 A1    9/2011  Lee et al.
2015/0208436 A1    7/2015  Seok
(Continued)

FOREIGN PATENT DOCUMENTS

KR    1020150051911 A    5/2015
WO    WO-2015190698 A1    12/2015
(Continued)

OTHER PUBLICATIONS

"International Application Serial No. PCT/US2017/049569, International Search Report dated Dec. 14, 2017", 3 pgs.
(Continued)

*Primary Examiner* — Timothy J Weidner
(74) *Attorney, Agent, or Firm* — Schwegman Lundberg & Woessner, P.A.

(57) ABSTRACT

Apparatuses, computer readable media, and methods for physical layer short feedback. An apparatus of a high efficiency (HE) station is disclosed. The apparatus comprising circuitry configured to: decode a trigger frame for short feedback, the trigger frame comprising an indication of a resource unit (RU) to respond to a short feedback request, where the RU comprises one or more tones and one or more symbols. The circuitry may be further configured to encode a short feedback response to the short feedback request on the RU, where each of the one or more tones of the RU is to be encoded with one or more of: a positive signal, a negative signal, and no signal. The circuitry may be further configured to configure the HE station to transmit the short feedback response to an access point in accordance with
(Continued)

orthogonal frequency division multiple access (OFDMA) using resources of the RU.

20 Claims, 16 Drawing Sheets

(51) Int. Cl.
    *H04L 5/00*     (2006.01)
    *H04L 5/02*     (2006.01)
    *H04L 27/00*     (2006.01)
    *H04L 27/20*     (2006.01)
    *H04L 27/26*     (2006.01)
    *H04W 72/04*     (2009.01)
    *H04W 74/00*     (2009.01)
    *H04W 74/06*     (2009.01)
    *H04W 84/12*     (2009.01)
    *H04W 88/02*     (2009.01)
    *H04W 88/08*     (2009.01)
    *H04W 92/10*     (2009.01)

(52) U.S. Cl.
    CPC .......... *H04L 5/0048* (2013.01); *H04L 5/0053* (2013.01); *H04L 5/0094* (2013.01); *H04L 5/023* (2013.01); *H04L 27/0008* (2013.01); *H04L 27/2071* (2013.01); *H04L 27/2613* (2013.01); *H04W 72/042* (2013.01); *H04W 72/044* (2013.01); *H04W 72/0406* (2013.01); *H04W 72/0413* (2013.01); *H04W 72/0453* (2013.01); *H04W 74/002* (2013.01); *H04W 74/004* (2013.01); *H04W 74/006* (2013.01); *H04J 2011/0009* (2013.01); *H04W 84/12* (2013.01); *H04W 88/02* (2013.01); *H04W 88/08* (2013.01); *H04W 92/10* (2013.01)

(58) Field of Classification Search
    CPC ........... H04L 27/2071; H04L 27/2613; H04W 48/02–20; H04W 72/005–14; H04W 74/002–0891; H04W 84/12; H04W 88/02; H04W 88/04–10; H04W 92/04; H04W 92/10

See application file for complete search history.

(56) References Cited

U.S. PATENT DOCUMENTS

| | | |
|---|---|---|
| 2016/0044656 A1 | 2/2016 | Novak et al. |
| 2016/0088628 A1 | 3/2016 | Zhang et al. |
| 2016/0164652 A1 | 6/2016 | Huang et al. |
| 2016/0233932 A1 | 8/2016 | Hedayat et al. |
| 2016/0261327 A1 | 9/2016 | Merlin et al. |
| 2017/0272138 A1* | 9/2017 | Chun ...................... H04L 29/08 |
| 2018/0205441 A1* | 7/2018 | Asterjadhi ............ H04W 74/06 |
| 2019/0007973 A1* | 1/2019 | Lou ...................... H04W 72/082 |

FOREIGN PATENT DOCUMENTS

| | | |
|---|---|---|
| WO | WO-2016076511 A1 | 5/2016 |
| WO | WO-2018071105 A1 | 4/2018 |

OTHER PUBLICATIONS

"International Application Serial No. PCT/US2017/054336, International Search Report dated Jan. 8, 2018", 5 pgs.

"International Application Serial No. PCT/US2017/054336, Written Opinion dated Jan. 8, 2018", 8 pgs.

"International Application Serial No. PCT/US2017/049569, International Preliminary Report on Patentability dated Apr. 25, 2019", 12 pgs.

"International Application Serial No. PCT/US2017/054336, International Preliminary Report on Patentability dated Apr. 25, 2019", 10 pgs.

"International Application Serial No. PCT/US2017/049569, Written Opinion dated Dec. 14, 2017", 10 pgs.

\* cited by examiner

| P-RU | SS | RB | | 810.1 | 810.2 | 810.3 | 810.4 | RU |
|---|---|---|---|---|---|---|---|---|
| | SS4 | RB1 | 812.1 | HE-LTF | -HE-LTF | HE-LTF | HE-LTF | 808.1 |
| | SS3 | RB2 | 812.2 | HE-LTF | HE-LTF | -HE-LTF | HE-LTF | 808.2 |
| | SS2 | RB3 | 812.3 | HE-LTF | HE-LTF | HE-LTF | -HE-LTF | 808.3 |
| P-RU1 | SS1 | RB4 | 812.4 | -HE-LTF | HE-LTF | HE-LTF | HE-LTF | 808.4 |
| | SS4 | RB5 | | HE-LTF | -HE-LTF | HE-LTF | HE-LTF | |
| | SS3 | RB6 | | HE-LTF | HE-LTF | -HE-LTF | HE-LTF | |
| | SS2 | RB7 | | HE-LTF | HE-LTF | HE-LTF | -HE-LTF | |
| P-RU2 | SS1 | RB8 | | -HE-LTF | HE-LTF | HE-LTF | HE-LTF | |
| | SS4 | RB9 | 812.4 | HE-LTF | -HE-LTF | HE-LTF | HE-LTF | |
| | SS3 | RB10 | | HE-LTF | HE-LTF | -HE-LTF | HE-LTF | |
| | SS2 | RB11 | | HE-LTF | HE-LTF | HE-LTF | -HE-LTF | |
| P-RU3 | SS1 | RB12 | | -HE-LTF | HE-LTF | HE-LTF | HE-LTF | |
| | SS4 | RB13 | | HE-LTF | -HE-LTF | HE-LTF | HE-LTF | |
| | SS3 | RB14 | | HE-LTF | HE-LTF | -HE-LTF | HE-LTF | |
| | SS2 | RB15 | | HE-LTF | HE-LTF | HE-LTF | -HE-LTF | |
| P-RU4 | SS1 | RB16 | | -HE-LTF | HE-LTF | HE-LTF | HE-LTF | |
| | SS4 | RB17 | | HE-LTF | -HE-LTF | HE-LTF | HE-LTF | |
| | SS3 | RB18 | | HE-LTF | HE-LTF | -HE-LTF | HE-LTF | |
| | SS2 | RB19 | | HE-LTF | HE-LTF | HE-LTF | -HE-LTF | |
| P-RU5 | SS1 | RB20 | | -HE-LTF | HE-LTF | HE-LTF | HE-LTF | |
| | SS4 | RB21 | | HE-LTF | -HE-LTF | HE-LTF | HE-LTF | |
| | SS3 | RB22 | | HE-LTF | HE-LTF | -HE-LTF | HE-LTF | |
| | SS2 | RB23 | | HE-LTF | HE-LTF | HE-LTF | -HE-LTF | |
| P-RU6 | SS1 | RB24 | 812.24 | -HE-LTF | HE-LTF | HE-LTF | HE-LTF | |
| | SS4 | RB25 | | HE-LTF | -HE-LTF | HE-LTF | HE-LTF | |
| | SS3 | RB26 | | HE-LTF | HE-LTF | -HE-LTF | HE-LTF | |
| | SS2 | RB27 | | HE-LTF | HE-LTF | HE-LTF | -HE-LTF | |
| P-RU7 | SS1 | RB28 | | -HE-LTF | HE-LTF | HE-LTF | HE-LTF | |
| | SS4 | RB29 | | HE-LTF | -HE-LTF | HE-LTF | HE-LTF | |
| | SS3 | RB30 | | HE-LTF | HE-LTF | -HE-LTF | HE-LTF | |
| | SS2 | RB31 | | HE-LTF | HE-LTF | HE-LTF | -HE-LTF | |
| P-RU8 | SS1 | RB32 | | -HE-LTF | HE-LTF | HE-LTF | HE-LTF | |
| | SS4 | RB33 | | HE-LTF | -HE-LTF | HE-LTF | HE-LTF | |
| | SS3 | RB34 | | HE-LTF | HE-LTF | -HE-LTF | HE-LTF | |
| | SS2 | RB35 | | HE-LTF | HE-LTF | HE-LTF | -HE-LTF | |
| P-RU9 | SS1 | RB36 | 812.36 | -HE-LTF | HE-LTF | HE-LTF | HE-LTF | 808.36 |

FIG. 8

PHYSICAL LAYER SHORT FEEDBACK

PRIORITY CLAIM

This application is a U.S. National Stage Filing under 35 U.S.C. 371 from International Application No. PCT/US2017/054336, filed Sep. 29, 2017 and published in English as WO 2018/071215 on Apr. 19, 2018, which claims the benefit of priority to U.S. Provisional Patent Application Ser. No. 62/406,771, filed on Oct. 11, 2016, and to U.S. Provisional Application Ser. No. 62/487,225, filed Apr. 19, 2017, all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11 ax. Some embodiments relate to methods, computer readable media, and apparatus for physical layer short feedback.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 8 illustrates resource units (RUs) for short feedback 208 in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
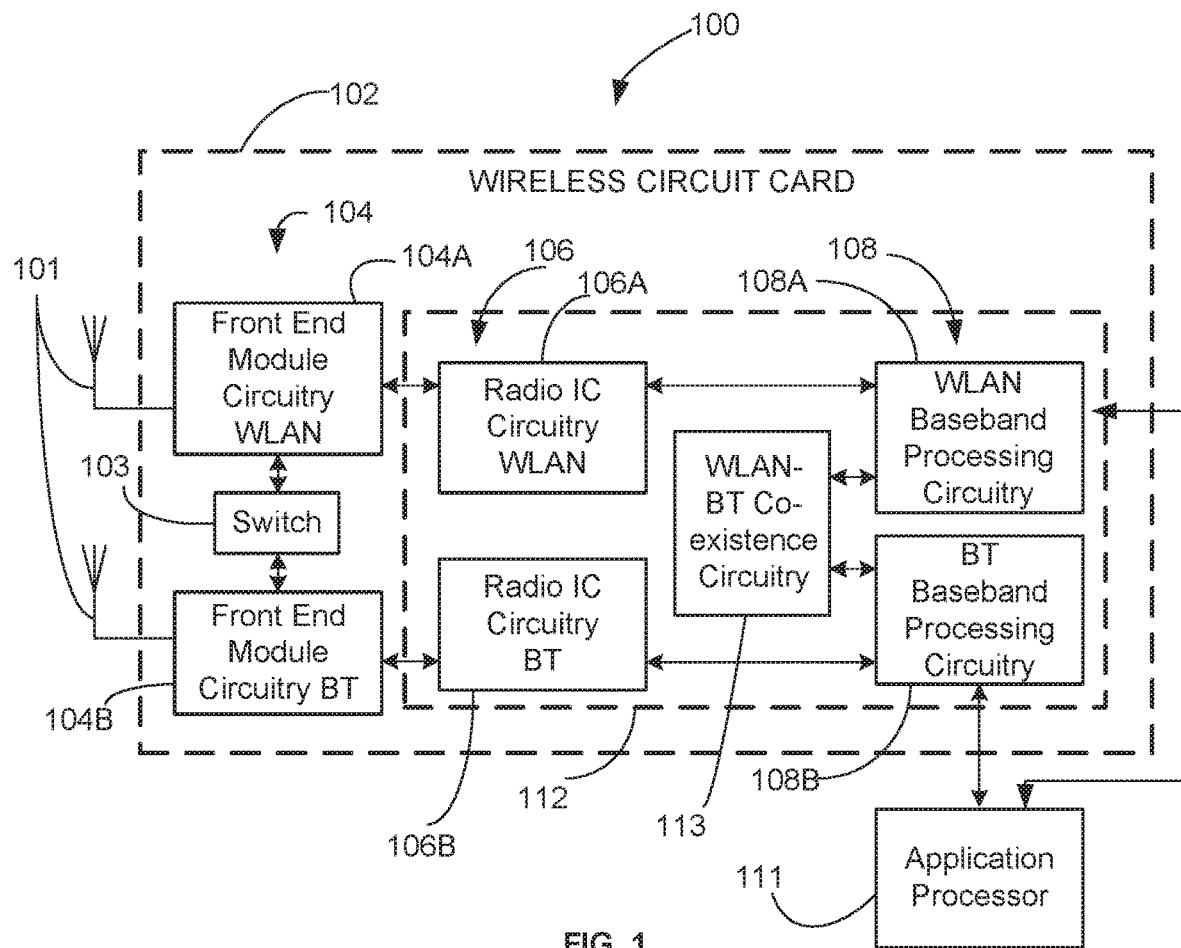
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11 ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.1 lax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz. 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
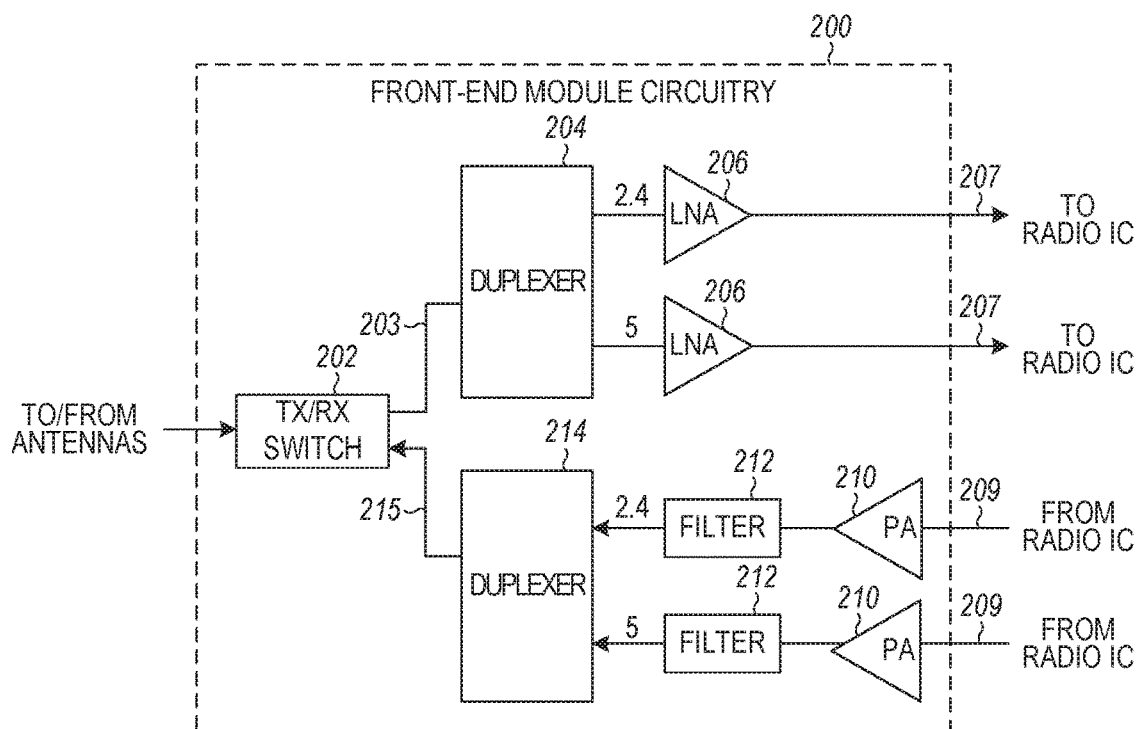
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
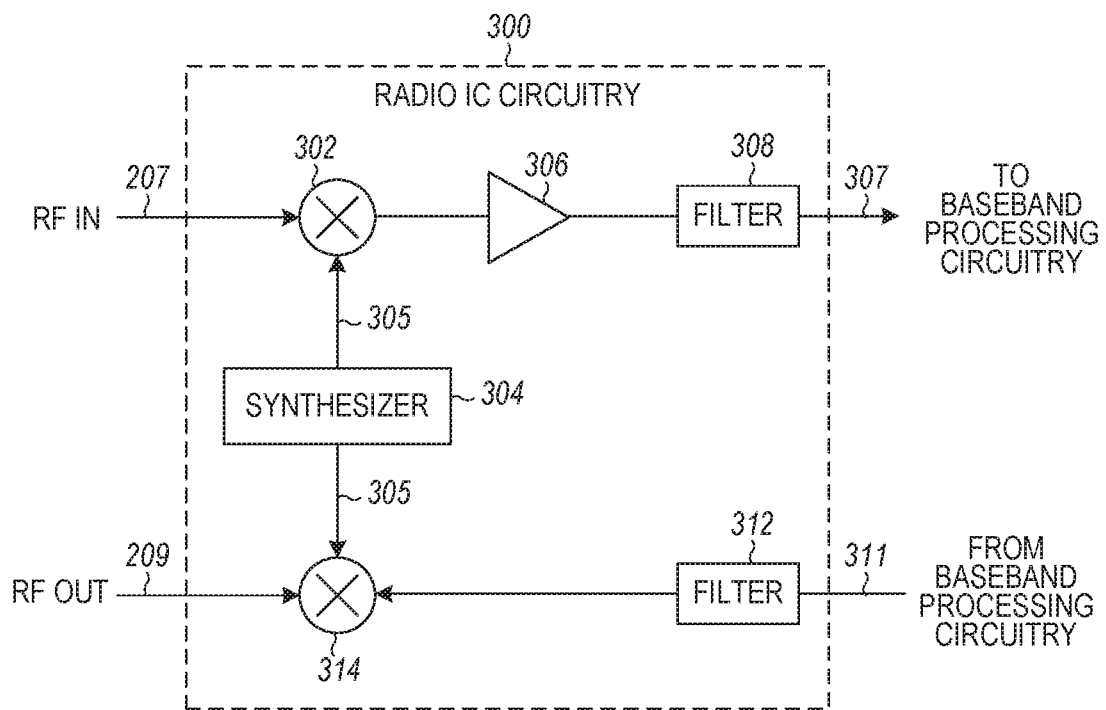
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
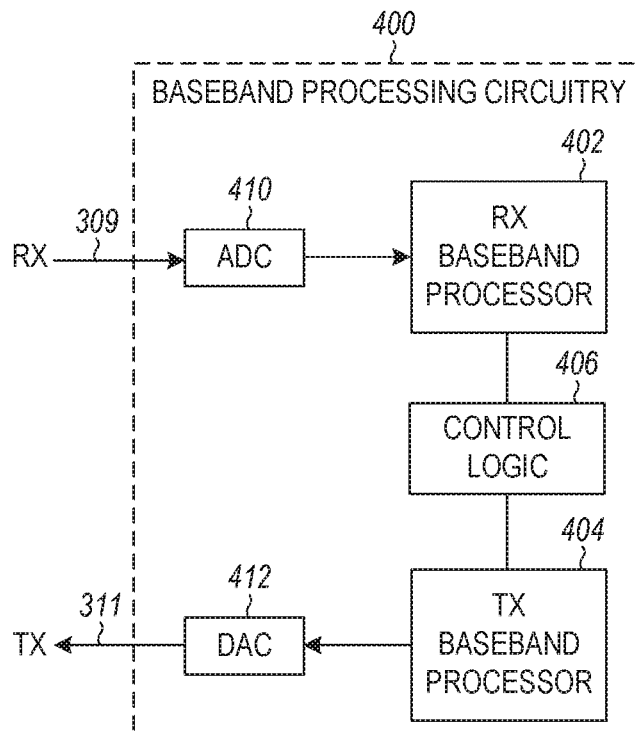
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
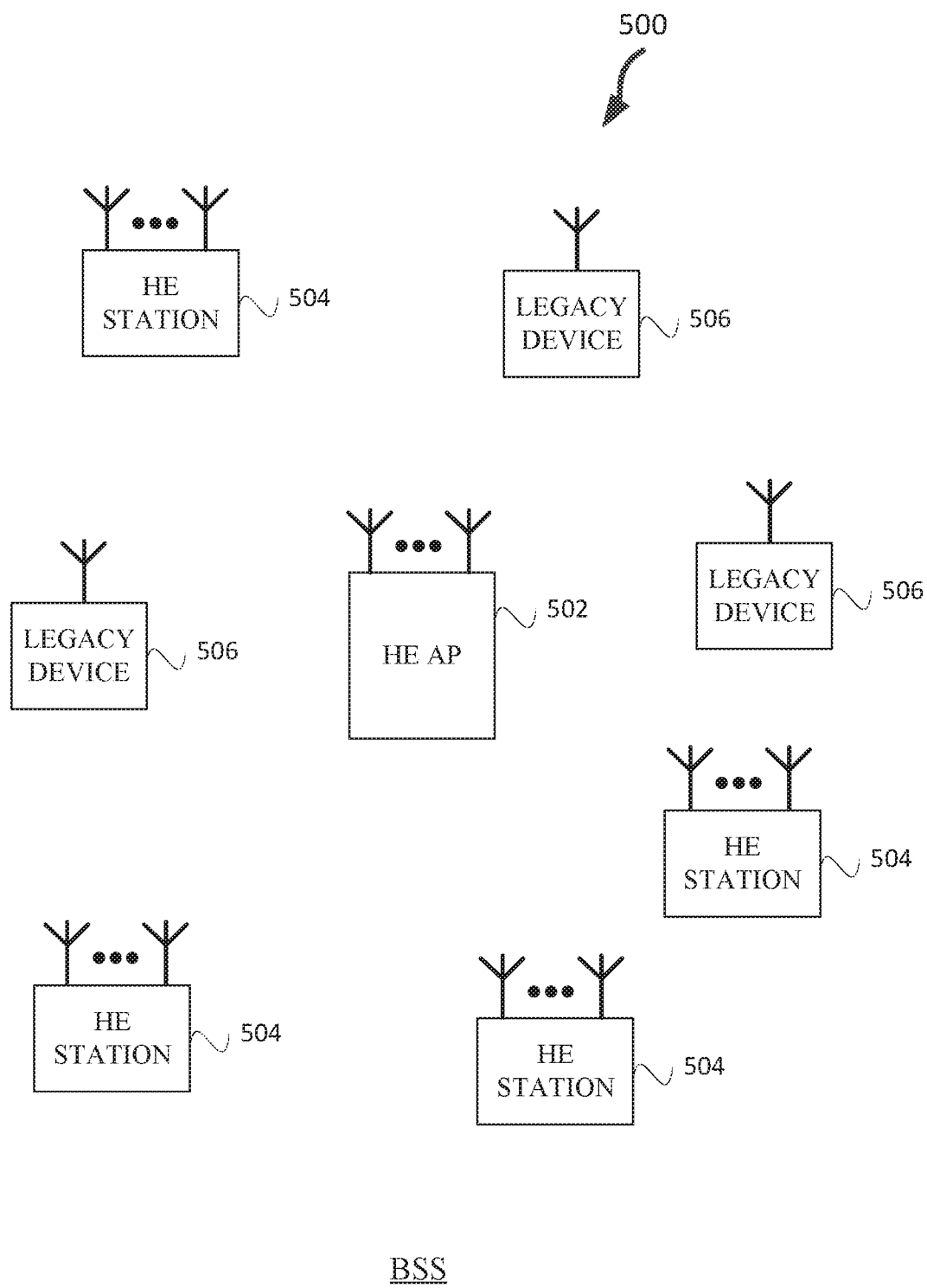
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.1 lax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments, the bandwidth of the channels may be based on a number of active data subcarriers. In some embodiments, the bandwidth of the channels is based on 26, 52, 106, 242, 484, 996, or 2×996 active data subcarriers or tones that are spaced by 20 MHz. In some embodiments, the bandwidth of the channels is 256 tones spaced by 20 MHz. In some embodiments, the channels are multiple of 26 tones or a multiple of 20 MHz. In some embodiments, a 20 MHz channel may comprise 242 active data subcarriers or tones, which may determine the size of a Fast Fourier Transform (FFT). An allocation of a bandwidth or a number of tones or subcarriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz. 40 MHz, 80 MHz, 160 MHz and 80+80 MHz OFDMA and MU-MIMO HE PPDU formats. In some embodiments, the 242-subcarrier RU is used in the 40 MHz. 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 IX, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g., IEEE 802.1 lax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments, the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments, the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-19.

In example embodiments, the HE station 504 and/or the HE AP 502 are configured to perform the methods and operations/functions described herein in conjunction with FIGS. 1-19. In example embodiments, an apparatus of the HE station 504 and/or an apparatus of the HE AP 502 are configured to perform the methods and functions described herein in conjunction with FIGS. 1-19. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
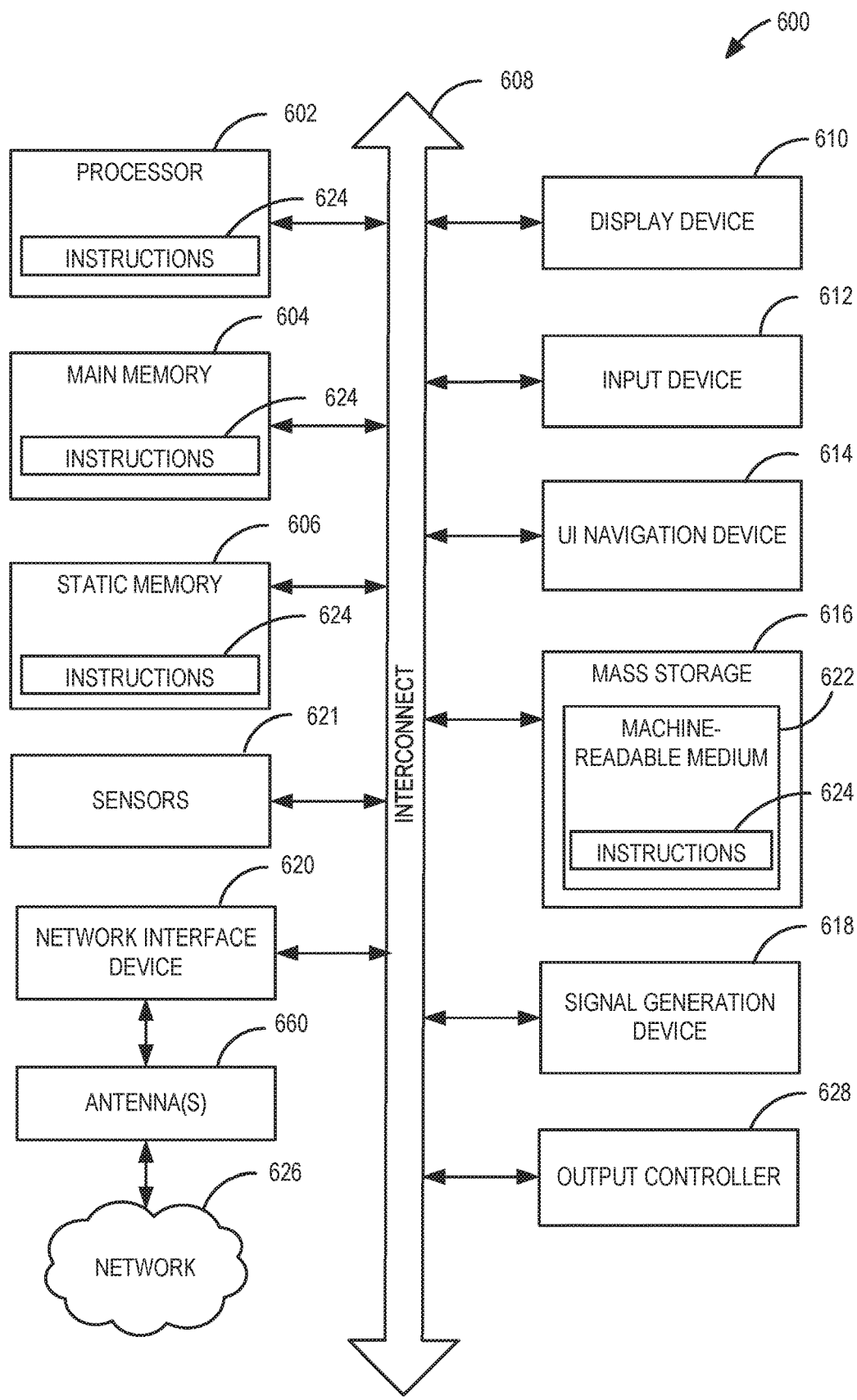
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fit, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
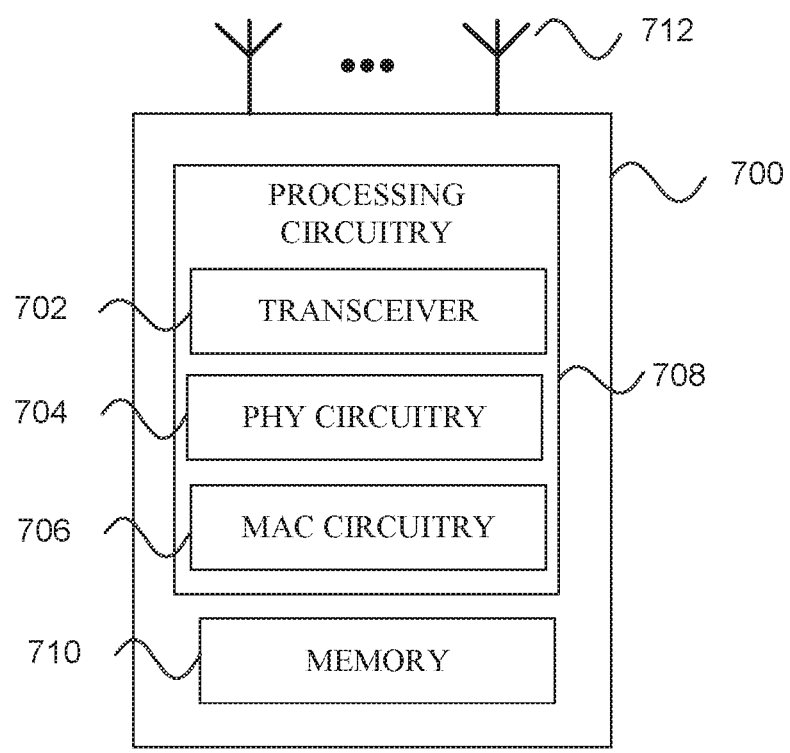
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments, the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general-purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

FIG. 8 illustrates resource units (RUs) for short feedback 208 in accordance with some embodiments. Illustrated in FIG. 8 is resource block (RB) table 851 and orthogonal code table 850. RB table 851 includes predetermined resource unit (P-RUs) 802, spatial stream (SS) 804, and RBs 812. The RB table 851 is divided into nine P-RUs 802, P-RU1, P-RU2, P-RU3, P-RU4, P-RU5, P-RU6, P-RU7, P-RU8, and P-RU9. Each of the P-RUs 802 is a subchannel of a channel in the frequency domain with a bandwidth. For example, each P-RU 802 may have a bandwidth of approximately 2 MHz (e.g., 2.03125) with 26 tones as part of a 20 MHz channel. Each P-RU 802 may include a number of spatial streams (SSs) 804. As illustrated, four SSs 804, SS1, SS2, SS3, and SS4. The RBs 812 are numbered sequentially based on the P-RUs 802 and the SSs 804. There are 36 RBs 806 in this illustration, which may be a subchannel, e.g., 20

MHz. The subchannel may be a subchannel that a HE long-training field (HE-LTF) is transmitted on or anther field. The RBs 812 may each be part of an HE-LTF.

The orthogonal code table 850 may use a P matrix table as the orthogonal code. The orthogonal table 850 includes RUs 808 and symbols 810. The symbols 810 may indicate symbols 810 in time, e.g., symbol 810.1 may be transmitted first, and then symbol 810.2, etc. The symbols 810 indicate the values of the orthogonal code for different RBs 812 and different symbols 810. A HE-LTF may indicate a positive voltage is used to transmit the symbol HE-LTF. A -HE-LTF may indicate a negative voltage is used to transmit the symbol 810. Each RU 808 of the orthogonal code table 850 corresponds to a RB 812 with four symbols 810 length. For example, RB 812.1 with symbols 810.1, 810.2, 810.3, and 810.4 corresponds to RU 808.1. In some embodiments, each RU 808 is assigned to a HE station 504 in a trigger frame for short feedback 1712. In some embodiments, each RU 808 is used to transmit one bit of information from a HE station 504 to a HE AP 502. For example, for a HE station 504 to transmit a one (1) the HE station 504 may transmit the orthogonal code of the RU 808. In some embodiments, the HE station 504 may indicate a zero (0) by not transmitting on the RU 808.

In some embodiments, the RB table 851 may be constructed with different P-RU 802 bandwidths or a different number of SSs 804. For example, in some embodiments, the RB table 851 may be for a different bandwidth, e.g., 40 MHz, 80 MHz, 80+80 MHz, or 160 MHz. In some embodiments, the number of tones assigned to each RB 812 may different. For example, as illustrated, each RB 812 includes 26 tones, but a different number of tones may be used, e.g., a predetermined number of tones between one (1) and fifty-two (52).

In some embodiments, the RBs 812 are a frequency resource allocation and a SS 804 resource allocation. The RU 808 may be a RB 812 allocation with a duration (e.g., 4 symbols 810) that, in some embodiments, includes an orthogonal code.

In some embodiments, a different number of SSs 804 may be used, e.g., a number of SSs of one (1) to sixteen (16). In some embodiments, a different orthogonal code may be used, e.g., a different row of the P Matrix or a different orthogonal code. In some embodiments, a different number of symbols 810 may be used, e.g., one symbol 810 to twelve symbols 810. In some embodiments, the symbols 810 may have a duration of four (4) μs each. In some embodiments, the symbols 810 may have a different duration, e.g., one (1) μs to twelve (12) μs. The RUs 808 may be divided by OFDMA and CDMA.

Figure 9:
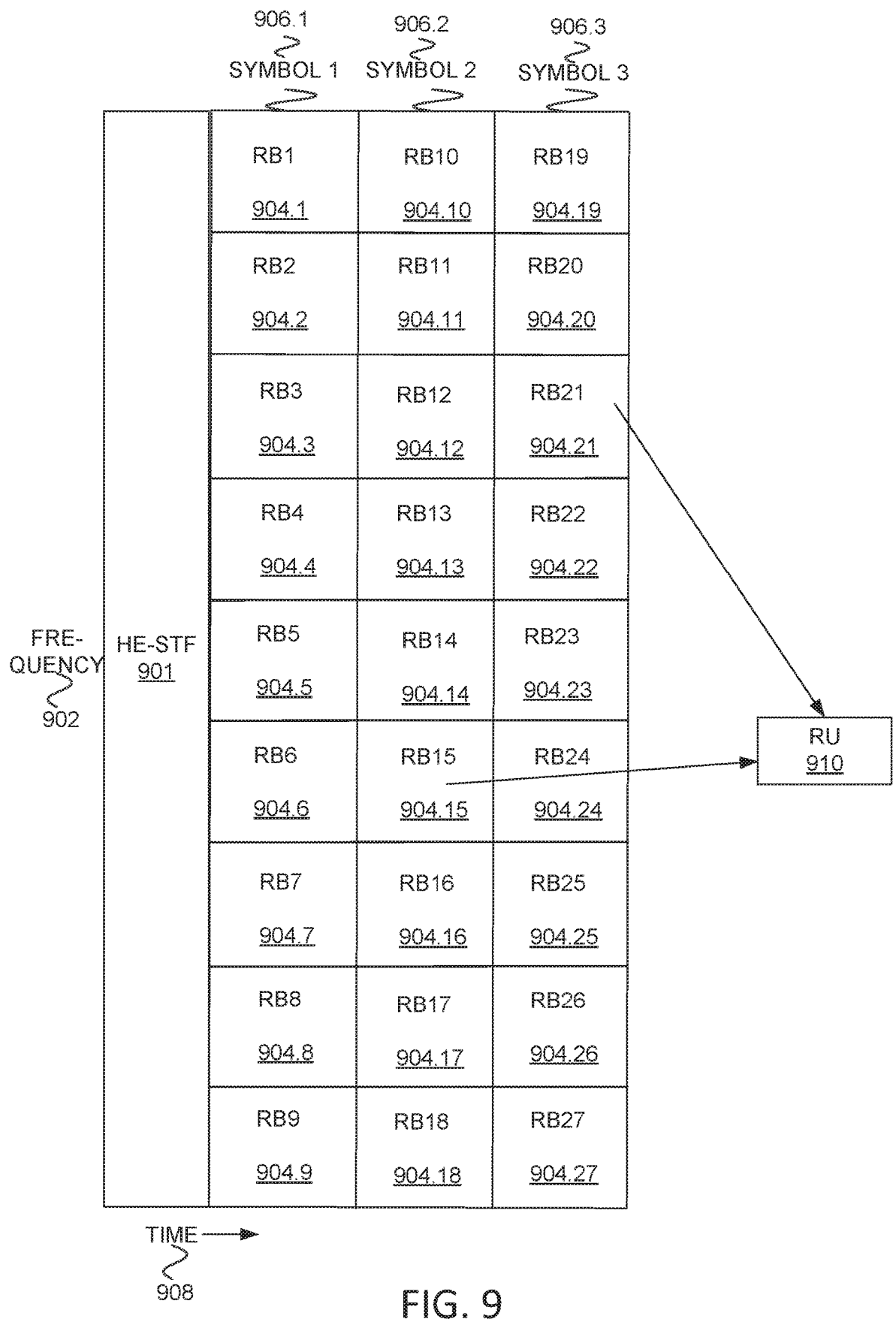
FIG. 9 illustrates RU for short feedback in accordance with some embodiments.

FIG. 9 illustrates RU 910 for short feedback in accordance with some embodiments. Illustrated in FIG. 9 is HE short-training field (HE-STF) 901, frequency 902, RBs 904, symbols 906, time 908, and RU 910.

In some embodiments, the symbols 906 may be part of a HE-LTF. The symbols 906 may have a duration, e.g. 4 μs. In some embodiments, the frequency 902 may be 20 MHz with each row of three RBs 904 approximately 2 MHz (e.g., 2.03125) with exactly 26 tones as part of a 20 MHz channel.

A RU 910 may be one or more RBs 904, e.g., as illustrated RU 910 is RB21 904.21 and RB24 904.15. The RU 910 may be assigned to a HE stations 504. The HE station 504 may transmit energy on the RU 910 to indicate one value (e.g., 0 or 1, or yes or no) and not transmit energy on the RU 910 to indicate a second value (e.g., 0 or 1, or yes or no). In some embodiments, each RB 906 may be assigned to a RU 910. In some embodiments, some RBs 906 are not assigned to RUs 910, which may increase the sensitivity of detecting RBs 906 that are assigned to RUs 910. A RB 906 may be OFDMA and TDMA.

In some embodiments, a different number of symbols 906 may be used, e.g., one symbol 906 to twelve symbols 906. In some embodiments, the symbols 906 may have a different duration, e.g., one (1) s to twelve (12) μs. The RBs 904 may be a different number of tones, e.g., 1 tone to 242 tones. In some embodiments, there may be RBs 904 for different SS, e.g., there may be twenty-seven (27) additional RB 904 for each extra SS. In some embodiments, the RU 910 may include an orthogonal code (e.g., P-matrix) that is used across the RBs 904 that comprise the RU 910. Different orthogonal codes may be used for different responses on the RU 910, e.g., a first orthogonal code for a 1 or yes, and a second orthogonal code for a 0 or no.

Figure 10:
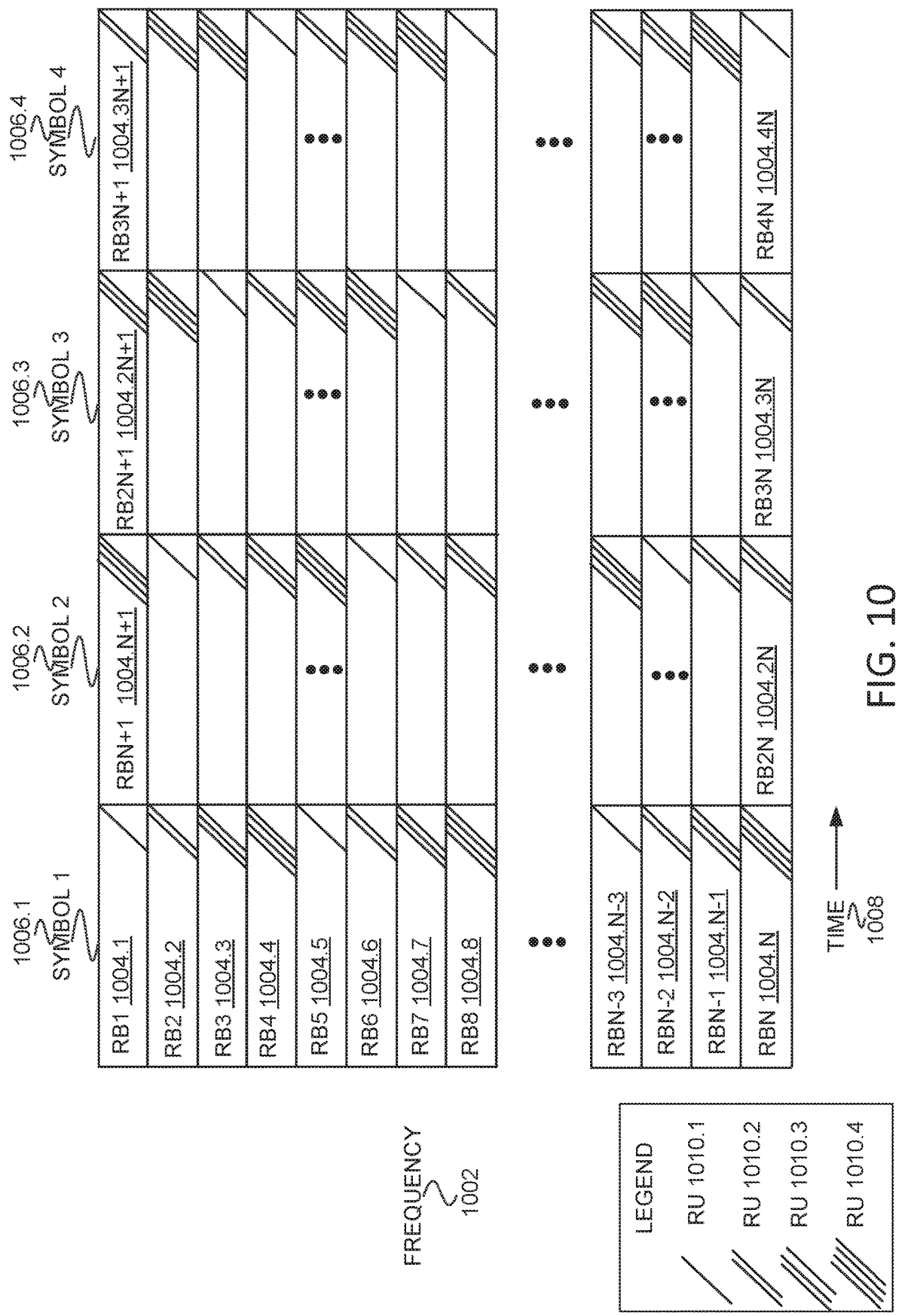
FIG. 10 illustrates RUs for short feedback in accordance with some embodiments.

FIG. 10 illustrates RUs 1010 for short feedback in accordance with some embodiments. Illustrated in FIG. 10 is frequency 1002, RBs 1004, symbols 1006, time 1008, and RUs 1010.

In some embodiments, the symbols 1006 may be part of a HE-LTF. The symbols 1006 may have a duration, e.g. 4 μs. In some embodiments, the frequency 1002 may be 20 MHz with each row of four RBs 1004 being a number of tones, e.g., 1 tone to 26 tones.

A RU 1010 may be one or more RBs 1004, e.g., as illustrated RU 1010.1 is RB1 1004.1, RB5 1004.5, RBN-3 1004.N-3, etc. The RUs 1010 may be every x tones, e.g., where x may be 2 through 26. In some embodiments, RBs 1004 are one or more tones, e.g., RBs 1004 may be 1 tone to 242 tones. In some embodiments, the N of RBN 1004.N is 242. In some embodiments, RB1 1004.1 through RBN.N is a 20 MHz channel with 242 tones with each RB 1004 being one tone. For symbol 1 1006.1, RU 1010.1 may include RB1 1004.1, RB5 1004.5, RB9 1004.9, RB13 1004.13, RB 17 1004.17, RB21 1004.21. RB25 1004.25, RB29 1004.29, RB33 1004.33, RB37 1004.37, RB41 1004.41, . . . , RB241 1004.41 (or RU 1010.1 may stop at RB237 1004.237 so that each RU 1010 has an equal number of RBs 1004). In some embodiments, some RBs 1004 may not be assigned to an RU 1010. In some embodiments, the number of RB 1004 may be different for different RUs 1010. In some embodiments, the number of RBs 1004 assigned to an RU 1010 is given by the number of RBs 1004 in the frequency divided by the number of RU 1010 with a fractional part dropped. For example, if frequency 1002 is 20 MHz and there are 242 tones with one tone assigned to each RB 1004, then the number of tones assigned to a RU 1010 may be 242 divided by 4 with the fractional part dropped (or divided among one or more RUs 1010), which equals 58.

Similarly, for symbol 2 1006.2, RU 1010.1 may include RBN+2 1004.N+2, RBN+6 1004+6, etc. The RBs 1004 assigned to the RUs 1010 may be interleaved (e.g., RB1 1004.1 for symbol 1 1006.1, RBN+2 1004.N+2 for symbol 2 1006.2. RB2N+3 1004.2N+3 for symbol 3 1006.3, and RB3N+4 1004.3N+4 for symbol 4 1006.4). The RU 1010 may include different groupings of the RB 1004, the RBs 1004 may include a different number of tones, and there may be a different number of symbols 1006.

The HE station 504 may transmit energy on the RU 1010 to indicate one value (e.g., 0 or 1, or yes or no) and not transmit energy on the RU 1010 to indicate a second value (e.g., 0 or 1, or yes or no). In some embodiments, an orthogonal code or another code may be used on the RBs 1004 to encode a response. In some embodiments, each RB 1004 may be assigned to an RU 1010. In some embodiments, some RBs 1004 are not assigned to RUs 1010, which may increase the sensitivity of detecting RBs 1004 that are assigned to RUs 1010. A RB 1006 may be OFDMA and TDMA.

In some embodiments, a different number of symbols 1006 may be used, e.g., one symbol 1006 to twelve symbols 1006. In some embodiments, the symbols 1006 may have a different duration, e.g., one (1) µs to twelve (12) µs. The RBs 1004 may be a different number of tones, e.g., 1 tone to 242 tones.

Figure 11:
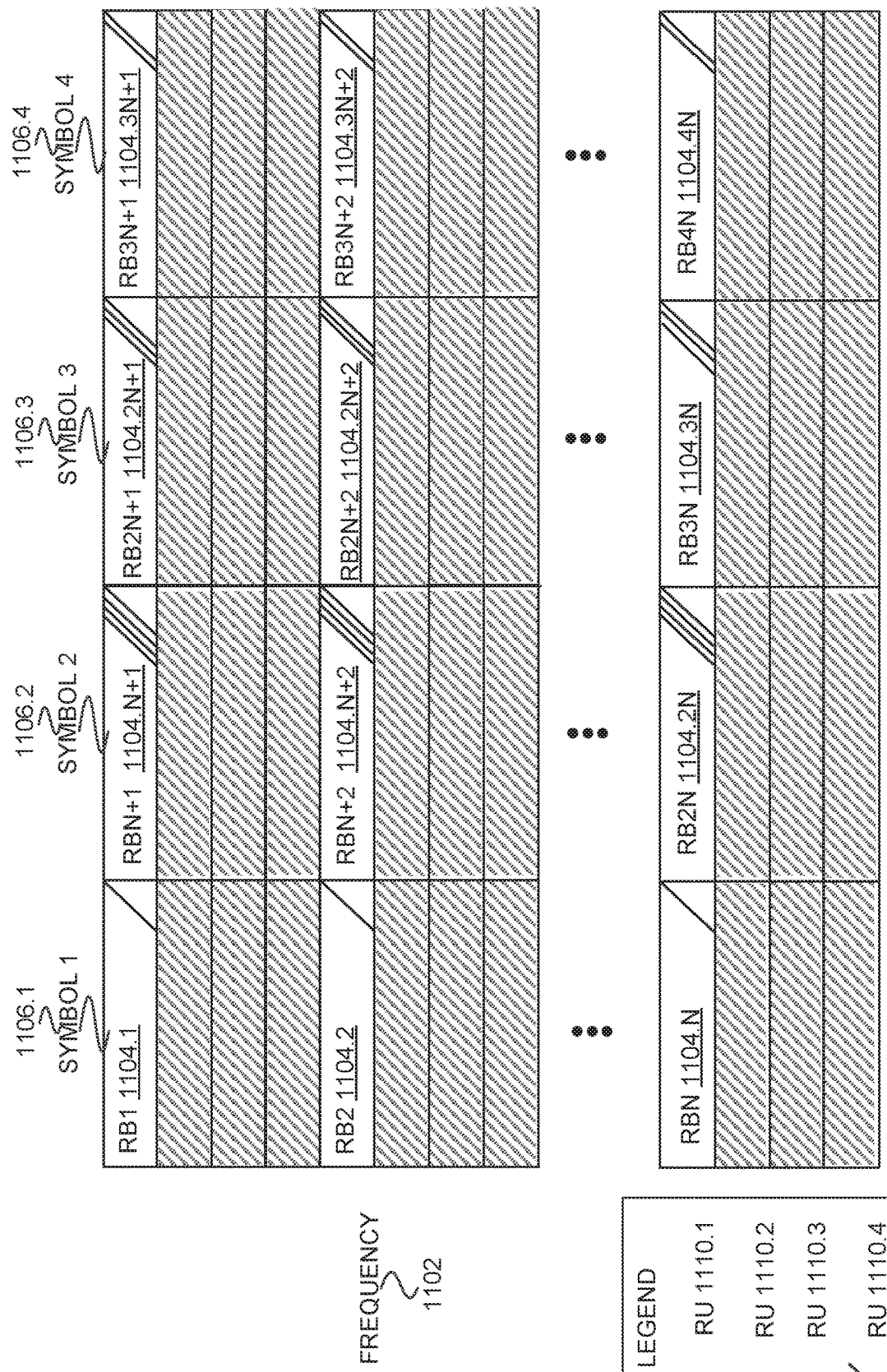
FIG. 11 illustrates RUs for short feedback in accordance with some embodiments.

FIG. 11 illustrates RUs 1110 for short feedback in accordance with some embodiments. Illustrated in FIG. 11 is frequency 1102, RBs 1104, symbols 1106, time 1108, and RUs 1110.

In some embodiments, the symbols 1106 may be part of a HE-LTF. The symbols 1106 may have a duration, e.g. 4 µs. In some embodiments, the frequency 1102 may be 20 MHz with each row of four RBs 1104 being a number of tones, for example, 1 tone to 242 tones.

A RU 1110 may be one or more RBs 1104, e.g., every four RB 1104 is grouped together into an RU 1110. For example, as illustrated RU 1110.1 is RB1 1104.1. RB2 1104.2, through RBN 1104.N.

The RUs 1110 may be every x tones, e.g., where x may be 2 through 26. For example, tones 1, 5, 9, . . . . N (symbol 1 1106.1) may be a RU 1110.1, tones 2, 6, 10, . . . , N (symbol 2 1106.2) may be RU 1110.2, tones 3, 7, 11, . . . , N (symbol 3 106.3) may be RU 1110.3, and tones 4, 8, 12, . . . , N (symbol 4 1106.4) may be RU 1103.4. In some embodiments, a different pattern of the tones may be used. The RUs (e.g., 1103) may include a pattern of tones (and optionally spatial streams) and a pattern of transmissions on the pattern of tones to indicate different responses.

In some embodiments, the frequency is 20 MHz with 242 tones and with each row of the RBs 1104 being one or more tones. In some embodiments, some RBs 1104 may not be assigned to an RU 1110. In some embodiments, the number of RBs 1104 may be different for different RUs 1110. In some embodiments, the number of RBs 1104 assigned to an RU 1110 is given by the number of RBs 1104 for a symbol 1106. The number of RBs 1104 for a symbol 1106 may be the number of rows in the frequency 1102 divided by the interleaving value, e.g., 4 as illustrated. For example, if there are 242 tones for frequency 1102 and 242 rows, then the number of RBs 1104 is 242 divided by 4 or 58 with 2 left over (which, in some embodiments, may be assigned to an RB). An RU 1110 may then have 58 RBs 1104 with one tone per RB 1104. If there were 4 tones per RB 1104, then each RU would have 14 RBs 1104 (e.g., 242 divided by 4 giving 58 rows, and then 58 divided by 4 giving 14 RBs 1104). In some embodiments, the remainder tones and/or rows may be used for RBs 1104.

The HE station 504 may transmit energy on the RU 1110 to indicate one value (e.g., 0 or 1, or yes or no) and not transmit energy on the RU 1110 to indicate a second value (e.g., 0 or 1, or yes or no). In some embodiments, the HE stations 504 may transmit an orthogonal code or another code to indicate a value. In some embodiments, each RB 1104 may be assigned to an RU 1110. In some embodiments, the not assigned rows may increase the sensitivity of detecting RBs 1104 that are assigned to RUs 1110. A RB 1106 may be OFDMA and TDMA.

In some embodiments, a different number of symbols 1106 may be used, e.g., one symbol 1106 to twelve symbols 1106. In some embodiments, the symbols 1106 may have a different duration, e.g., one (1) µs to twelve (12) µs. The RBs 1104 may be a different number of tones, e.g., 1 tone to 242 tones.

In some embodiments, multiplexing the RBs 1104 in the frequency and time domain increases the robustness for multi-path problems and carrier frequency offsets. As illustrated in FIG. 11, the receiver may be better able to distinguish the short feedback from different HE station 504 based on the time 1108 diversity.

Figure 12:
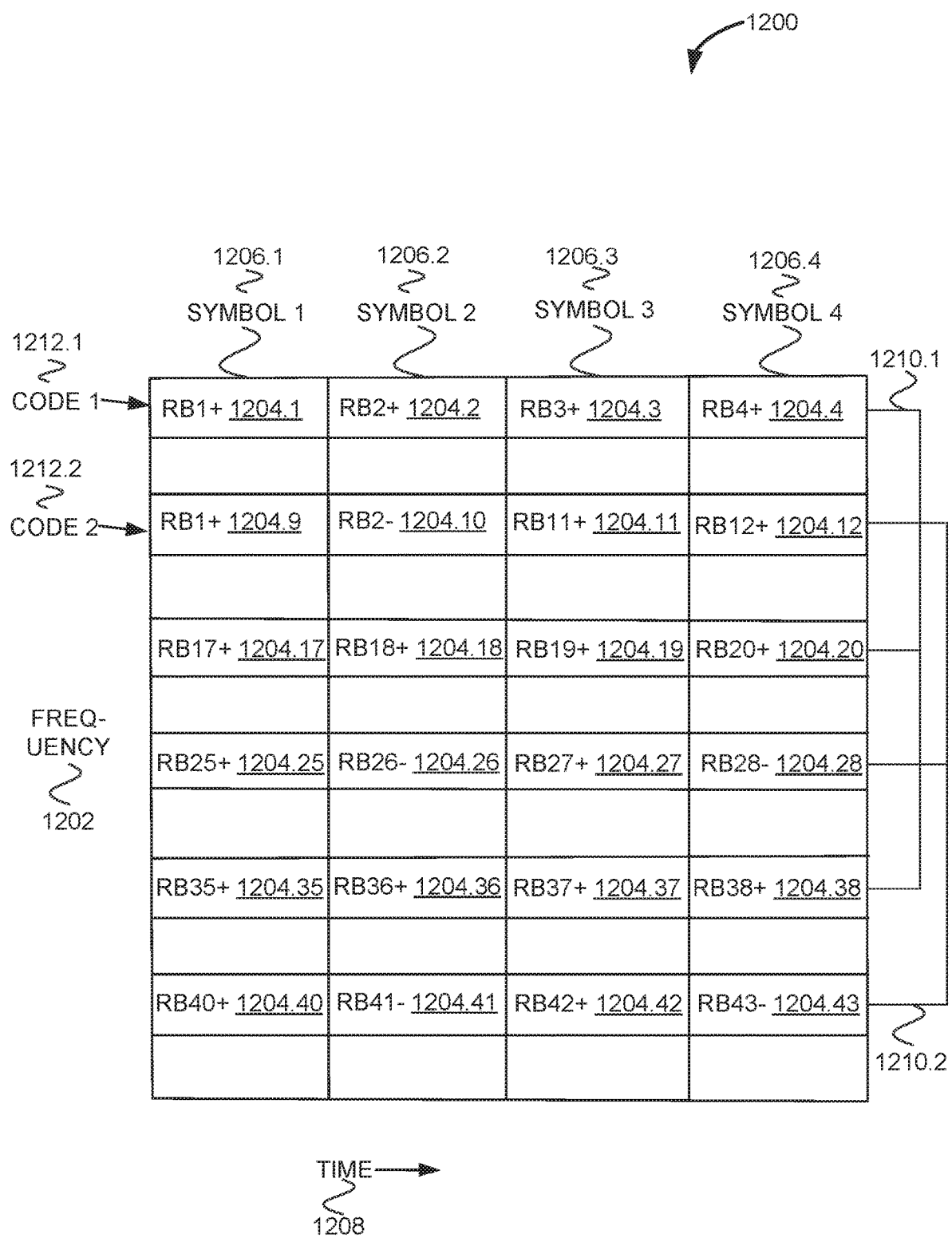
FIG. 12 illustrates RUs for short feedback in accordance with some embodiments.

FIG. 12 illustrates RUs 1210 for short feedback in accordance with some embodiments. Illustrated in FIG. 12 is frequency 1202, RBs 1204, symbols 1206, time 1208, and RUs 1210.

In some embodiments, the symbols 1206 may be part of a HE-LTF. The symbols 1206 may have a duration, e.g. 4 µs. In some embodiments, the frequency 1202 may be 20 MHz with each row of four RBs 1204 being a number of tones, for example, 1 tone to 242 tones.

A RU 1210 may be one or more rows of RBs 1204, e.g., as illustrated, RU 1210.1 includes on a first row RB1+ 1204.1, RB2+1204.2, RB3+1204.3, and RB4+1204.4; on a second row RB 17+1204.17, RB18+1204.18, RB18+ 1204.18, and RB19+1204.19; and, on a third row RB35+ 1204.35, RB36+1204.36, RB37+1204.37, and RB4+ 1204.38. Codes 1212 may be orthogonal codes. Code 1 1212.1 may be (+, +, +, +), which may be a row of a P-matrix. Code 2 1212.2 may be (+, −, +, −), which may be an orthogonal row to code 1 1212.1. The pluses may indicate transmitting a positive voltage and the negatives may indicate transmitting a negative voltage. In some embodiments, different orthogonal codes may be used. In some embodiments, a HE station 504 may transmit different orthogonal codes along a row to indicate different responses to the short feedback. In some embodiments, the different orthogonal codes are termed patterns. For example, one row of the P-matrix may indicate a zero or no and another row of the P-matrix may indicate a one or a yes. As another example, there may be four orthogonal codes (e.g., P-matrix rows), and each row may be used to indicate a different answer, e.g., short feedback 1, short feedback 2, short feedback 3, or short feedback 4.

In some embodiments, the RUs 1210 may be comprised of different groupings of the RBs 1204. In some embodiments, the codes 1212 may be on-off codes. For example, (1, 1, 1, 1,), (0, 1, 1, 1), etc. Using on-off codes would enable a row to indicate up to eight different short feedback responses.

In some embodiments, the on-off codes are more robust than an orthogonal code (e.g., P-matrix) in the presence of carrier frequency offset. The P-matrix code has a higher average power than the on-off codes, which may make it easier to detect.

Different codes, e.g., columns or rows of an orthogonal code (e.g., P-matrix) may be used for short feedback. Moreover, an RU 1210 may permit multiple codes or sequences to be sent for short feedback. For example, for RU 1210.1 each of the three rows would have a different on-off code or different P-matrix code to indicate additional responses to the short feedback.

The RUs 1210 may be comprised of RBs 1204 that are organized by columns. For example, RU 1210.1 may include RB1+1204.1, RB1+1204.9, etc. In some embodiments, the columns may interleave, for example, RB1+1204.1, RB17+ 1204.17, etc.

The RUs 1110 may be every x tones, e.g., where x may be 2 through 26. For example, tones 1, 5, 9, . . . . N (symbol 1 1106.1) may be a RU 1110.1, tones 2, 6, 10, . . . . N (symbol 2 1106.2) may be RU 1110.2, tones 3, 7, 11, . . . , N (symbol 3 1106.3) may be RU 1110.3, and tones 4, 8, 12, . . . , N (symbol 4 1106.4) may be RU 1103.4. The on-offcodes or orthogonal codes may then be used on the columns rather than the rows. In some embodiments, the on-off codes or orthogonal codes may be repeated down a column, e.g., if the on-off code or orthogonal code has a length of four, then it may be repeated or interleaved down a column.

In some embodiments, the frequency is 20 MHz with 242 tones and with each row of the RBs 1204 being one or more tones. In some embodiments, some RBs 1204 may not be assigned to an RU 1210. In some embodiments, the number of RB 1204 may be different for different RUs 1210.

For the on-off codes, the HE station 504 may transmit energy on the RU 1210 to indicate one value (e.g., 0 or 1, or yes or no) and not transmit energy on the RU 1210 to indicate a second value (e.g., 0 or 1, or yes or no). In some embodiments, the on-off codes may use patterns to indicate different short feedback responses. For the P-matrix, the HE station 504 may transmit a negative voltage for a plus and a negative voltage for a minus.

In some embodiments, a different number of symbols 1206 may be used. e.g., one symbol 1206 to twelve symbols 1206. In some embodiments, the symbols 1206 may have a different duration, e.g., one (1) µs to twelve (12) µs. The RBs 1204 may be a different number of tones, e.g., 1 tone to 242 tones.

In some embodiments, the codes 1212 may be used on less than the total number of rows or columns of the RU 1210, e.g., RU 1210.1 includes three rows of RBs 1204 and different codes may be used on each row to indicate different responses to short feedback requests.

Figure 13:
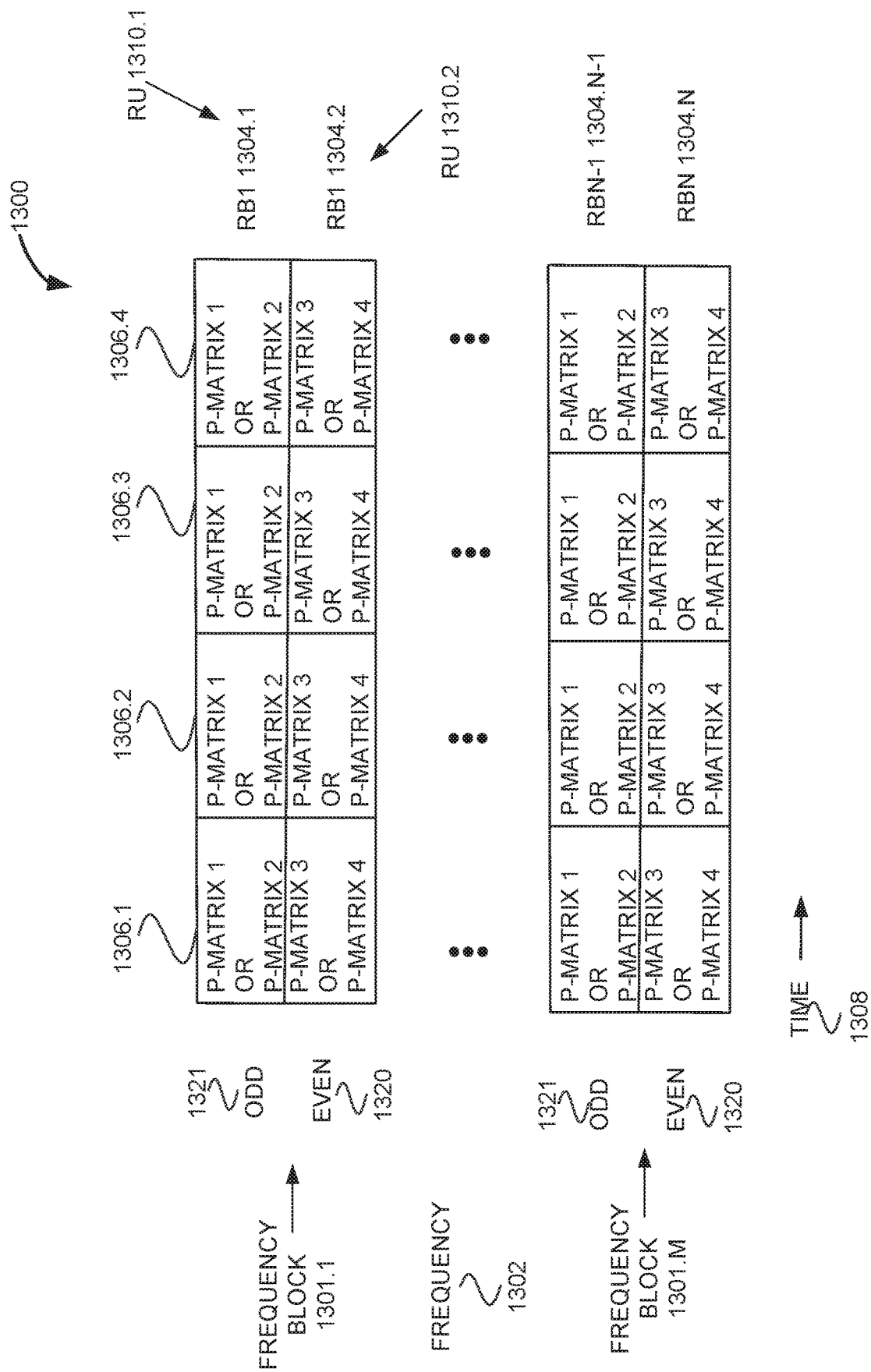
FIG. 13 illustrates RUs for short feedback in accordance with some embodiments.

FIG. 13 illustrates RUs 1310 for short feedback in accordance with some embodiments. Illustrated in FIG. 13 is frequency 1302, RBs 1304, symbols 1306, time 1308, and RUs 1310.

In some embodiments, the symbols 1306 may be part of a HE-LTF. The symbols 1306 may have a duration, e.g. 4 µs. In some embodiments, the frequency 1302 may be divided into multiple frequency blocks 1301 each with odd tones 1321 and even tones 1320. The frequency 1302 may be 20 MHz, 40 MHz, 80 MHz, 80+80 MHz, or 160 MHz, in accordance with some embodiments.

The RBs 1304 may be odd tones 1321 or even tones 1320 across two or more of the symbols 1306. The RU 1310 may include an RB 1304 of odd tones 1321 or even tones 1320 where the P-matrix is used to mask the tones. P-Matrix 1 and P-Matrix 2 may indicate a row of the P-Matrix. The RBs 1304 can either be two symbols 1306 or four symbols 1306 (or extended to more symbols.) The P-Matrix 1, P-Matrix 2, P-Matrix 3, and P-Matrix 4 are orthogonal with one another, in some embodiments. An RU 1310 may then be an RB 1304 where the HE station 504 transmits one P-Matrix row for a first short feedback response or another P-Matrix row for a second short feedback response. For example, RU 1310.1 may be RB1 1304.1, which may include all four symbols 1306. A HE station 504 may use a row of length four to indicate a first response to a short feedback request and another row of length four to indicate a second response where the rows are from orthogonal code such as the P-Matrix. In some embodiments, only two symbols 1306 are used for a RU 1310 and the P-Matrix used is 2×2.

In some embodiments, eight (8) symbols 1306 are used to extend a HE-LTF. In the odd tones 1321 the $1^{st}$-$4^{th}$ rows of the P-Matrix are used to mask the tones across the eight symbols 1321. In the even tones 1320, the $5^{th}$-$8^{th}$ rows of the P-matrix can be used to mask the tones across the eight (8) symbols 1306.

In some embodiments, codes are used that are orthogonal for the odd tones 1321 and the even tones 1320. In some embodiments, different orthogonal codes may be used. In some embodiments, a HE station 504 may transmit different orthogonal codes along a row to indicate different short feedback responses. For example, one row of the P-matrix may indicate a zero or no and another row of the P-matrix may indicate a one or a yes. As another example, there may be four orthogonal codes (e.g., P-matrix rows), and each row may be used to indicate a different answer.

In some embodiments, the RUs 1310 may be comprised of different groupings of the RBs 1304. In some embodiments, the P-matrix may be on-off codes. For example, (1, 1, 1, 1,), (0, 1, 1, 1), etc. In some embodiments, using on-off codes would enable a row to indicate up to eight different short feedback responses, e.g., 2 raised to the number of symbols 1306.

In some embodiments, the on-off codes are more robust than an orthogonal code (e.g., P-matrix) in the presence of carrier frequency offset. The P-matrix code has a higher average power than the on-off codes, which may make it easier to detect.

In some embodiments, a row may be one tone 1306. In some embodiments, a row may be more than one tone. In some embodiments, a RU 1310 may include more than one row of odd tones 1321 or even tones 1320. In some embodiments, a RU 1310 may be a combination of one or more rows of odd tones 1321 and even tones 1320.

For the on-off codes, the HE station 504 may transmit energy on the RU 1310 to indicate one value (e.g., 0 or 1, or yes or no) and not transmit energy on the RU 1310 to indicate a second value (e.g., 0 or 1, or yes or no). For the P-matrix, the HE station 504 may transmit a negative voltage for a plus and a negative voltage for a minus.

In some embodiments, a different number of symbols 1306 may be used, e.g., one symbol 1306 to twelve symbols 1306 may be used. In some embodiments, the symbols 1306 may have a different duration, e.g., one (1) µs to twelve (12) µs. In some embodiments, rows may not be part of a RB 1304. The RU 1310 design of FIG. 13 may be termed an OFDMA and CDMA design in accordance with some embodiments.

Figure 14:
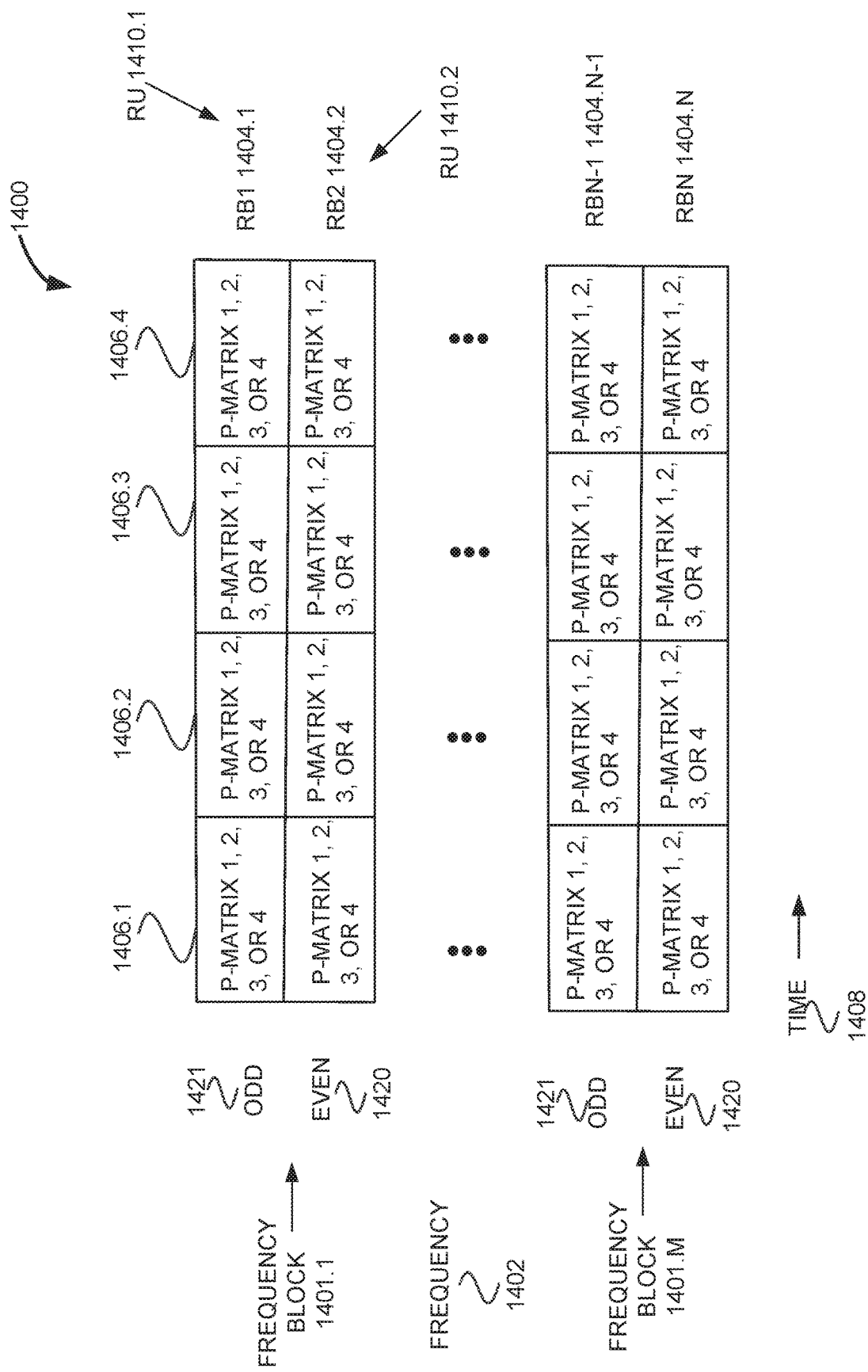
FIG. 14 illustrates RUs for short feedback in accordance with some embodiments.

FIG. 14 illustrates RUs 1410 for short feedback in accordance with some embodiments. Illustrated in FIG. 14 is frequency 1402, RBs 1404, symbols 1406, time 1408, and RUs 1410.

In some embodiments, the symbols 1406 may be part of a HE-LTF. The symbols 1406 may have a duration, e.g. 4 is. In some embodiments, the frequency 1402 may be divided into multiple frequency blocks 1401 each with odd tones 1421 and even tones 1420. The frequency 1402 may be 20 MHz, 40 MHz, 80 MHz, 80+80 MHz. or 160 MHz, in accordance with some embodiments.

The RBs 1404 may be odd tones 1421 or even tones 1420 across two or more of the symbols 1406. The RU 1410 may include an RB 1404 of odd tones 1421 or even tones 1420 where the P-matrix is used to mask the tones. P-Matrix 1-4 may indicate a row of the P-Matrix. The RBs 1404 can either be two symbols 1406 or four symbols 1406 (or extended to more symbols.) The P-matrix rows are orthogonal. An RU 1410 may then be an RB 1404 where the HE station 504 transmits one P-Matrix row for a first short feedback response or another P-Matrix row for a second short feedback response. For example, RU 1410.1 may be RB1

1404.1, which may include all four symbols 1406. A HE station 504 may use a row of length four to indicate a first short feedback response to a short feedback request and another row of length four to indicate a second short feedback response where the rows are from orthogonal codes such as the P-Matrix. In some embodiments, there may be up to 2 raised to the power of the number of symbols 1406. In some embodiments, only two symbols 1406 are used for a RU 1410 and the P-Matrix used is 2×2.

In some embodiments, binary phase-shift keying (BPSK) or quadrature binary phase-shift keying (QBPSK) is used to encode the short feedback response. For example, the odd tones 1421 may be BPSK and the even tones 1421 may be QBPSK. In some embodiments, this enables the use of four different rows of the P-matrix by the HE station 504 to indicate different values of a short feedback response.

In another example, a HE station 504 may be configured to encode symbols 1406 with QBPSK to indicate a short feedback response. For example, if the RU 1410 is one row with the first two symbols 1406, then a QBPSK phase rotation of the odd tone 1421 of symbol 1 1406.1 may be used to indicate a short feedback response. The receiver (e.g., HE AP 502) may expect odd tones 1421 and/or even tones 1420 to have a certain phase rotation and if a different phase rotation is used then this can be used to encode a short feedback response.

Because the channel responses of the adjacent tones (e.g., odd tones 1421 and even tones 1420) are highly correlated, the receiver (e.g., HE AP 502) can roughly assume the channel remains constant over the adjacent tones e.g. two adjacent tones. After dispreading, the HE AP 502 could compare each pair of tones in the frequency block. The HE AP 502 may be able to determine if the phases (e.g., BPSK and QBPSK) of the adjacent tones are well aligned or if the phase difference is around 90 degree. If the adjacent tones are well aligned it may be a first short feedback response and if the tones are not well aligned, then it may be a second short feedback response.

In some embodiments, the HE station 502 may encode a response by not sending any signal, which the HE AP 502 may be able to detect no signal for the HE station 504 and interpret it as a short feedback response.

In some embodiments, eight (8) symbols 1406 are used to extend a HE-LTF. In some embodiments, in the odd tones 1421 the $1^{st}$-$4^{th}$ rows of the P-Matrix are used to mask the tones across the eight symbols 1421. In the even tones 1420, the $5^{th}$-$8^{th}$ rows of the P-matrix can be used to mask the tones across the eight (8) symbols 1406. In some embodiments, codes are used that are orthogonal for the odd tones 1421 and the even tones 1420.

In some embodiments, different orthogonal codes may be used. In some embodiments, a HE station 504 may transmit different orthogonal codes along a row to indicate different responses to the short feedback. For example, one row of the P-matrix may indicate a zero or no and another row of the P-matrix may indicate a one or a yes. As another example, there may be four orthogonal codes (e.g., P-matrix rows), and each row may be used to indicate a different answer.

In some embodiments, the RUs 1410 may be comprised of different groupings of the RBs 1404. In some embodiments, the P-matrix may be on-off codes. For example, (1, 1, 1, 1,), (0, 1, 1, 1), etc. In some embodiments, using on-off codes would enable a row to indicate up to eight different short feedback responses.

In some embodiments, the on-off codes are more robust than an orthogonal code (e.g., P-matrix) in the presence of carrier frequency offset. The P-matrix code has a higher average power than the on-off codes, which may make it easier to detect.

In some embodiments, a row may be one tone. In some embodiments, a row may be more than one tone. In some embodiments, a RU 1410 may include more than one row of odd tones 1421.

For the on-off codes, the HE station 504 may transmit energy on the RU 1410 to indicate one value (e.g., 0 or 1, or yes or no) and not transmit energy on the RU 1410 to indicate a second value (e.g., 0 or 1, or yes or no). For the P-matrix, the HE station 504 may transmit a negative voltage for a plus and a negative voltage for a minus.

In some embodiments, a different number of symbols 1406 may be used, e.g., one symbol 1406 to twelve symbols 1406 may be used. In some embodiments, the symbols 1406 may have a different duration, e.g., one (1) µs to twelve (12) µs. In some embodiments, rows may not be part of a RB 1404. The RU 1410 design of FIG. 14 may be termed a OFDMA and CDMA, design in accordance with some embodiments.

Figure 15:
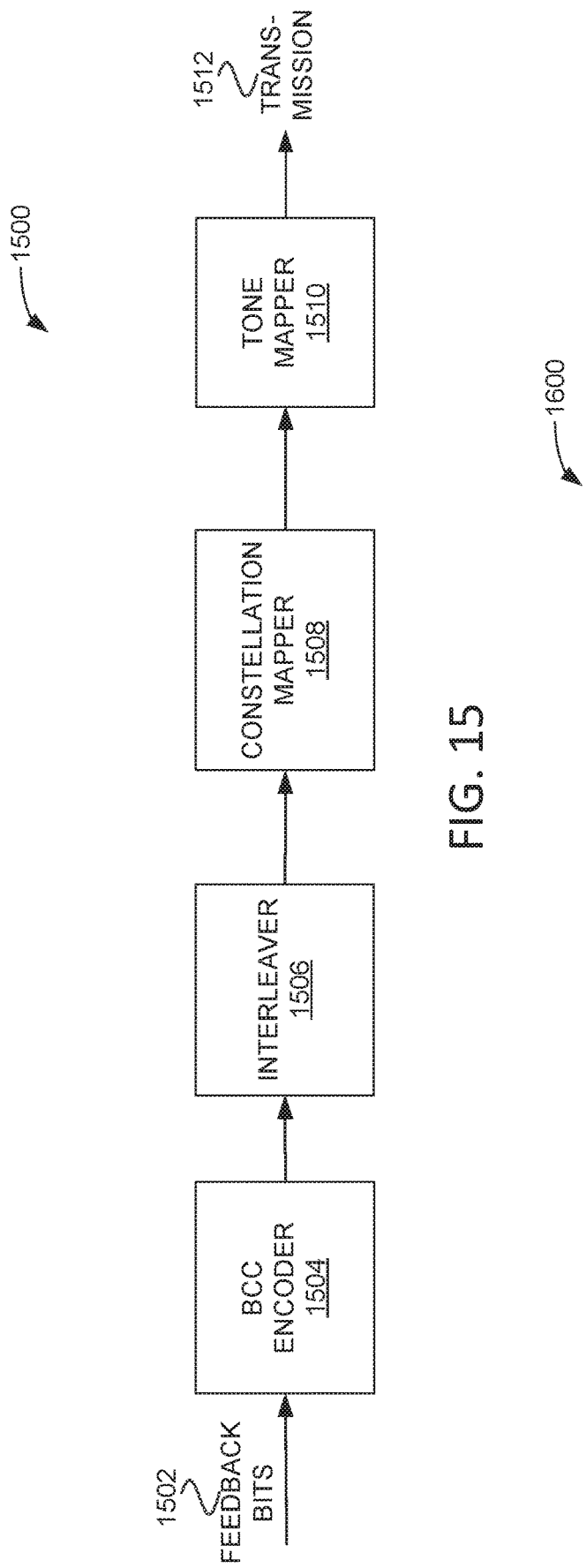
FIG. 15 illustrates transmission encoding for feedback bits in accordance with some embodiments.

FIG. 15 illustrates transmission encoding 1500 for feedback bits in accordance with some embodiments. Illustrated in FIG. 15 is feedback bits 1502, binary convolutional coding (BCC) encoder 1504, interleaver 1506, constellation mapper 1508, tone mapper 1510, and transmission 1512. The feedback bits 1502 may be feedback responses such as an indication if the HE station 504 wants UL resources. The feedback bits 1502 are feed into the BCC encoder 1504 to encode bits for error correction. The interleaver 1506 may interleave the output of the BCC encoder 1504 so that if errors occur they are less likely to affect large numbers of adjacent bits. The output of the interleaver 1506 is then feed into the constellation mapper 1508 which maps bits to constellation, e.g., a number of bits to each constellation. The output of the constellation mapper 1508 is feed into the tone mapper 1510 which may map the constellations on the tones that are going to be used for the transmission 1512. The feedback bits 1502 may then be transmitted in a transmission 1512 that is in accordance with the output of the tone mapper 1510.

Figure 16:
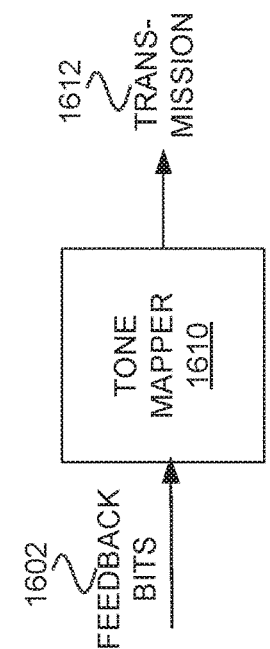
FIG. 16 illustrates transmission encoding for feedback bits 1602 in accordance with some embodiments.

FIG. 16 illustrates transmission encoding 1600 for feedback bits 1602 in accordance with some embodiments. Illustrated in FIG. 16 is feedback bits 1602, tone mapper 1610, and transmission 1612. The feedback bits 1602 may be short feedback responses. For example, an indication if the HE station 504 wants UL resources to transmit to the HE AP 502. The feedback bits 1602 are feed into the tone mapper 1610 which may map the feedback bits 1602 into tones. The feedback bits may be mapped into an RU 808, 910, 1010, 1110, 1210, 1310, and 1410. The tones are then transmitted at transmission 1612. For example, the HE station 504 may receive RU 1010.1 and determine to request UL resources from the HE AP 502. The HE station 504 may transmit on RB1 1004.1, RB5 1004.5, . . . , RB4N 1004.4N, for the short feedback response which may be one bit that indicates that the HE station 504 wants UL resources from the HE AP 502.

In some embodiments, the short feedback responses are directly encoded in accordance with the RUs 808, 910, 1010, 1110, 1210, 1310, 1410 and/or 1710. The tone mapper 1610 may encode the feedback bits as described in conjunction with operation 1758 of FIG. 17. In some embodiments, the transmission encoding 1600 may be termed a direct encoding because the encoding may not redundant bits for error detection and/or correction. In some embodiments, the transmission encoding 1600 may be termed a direct encoding because the encoding may not include one or more of the operations of FIG. 15, e.g., BCC encoder 1504, interleaver 1506, constellation mapper 1508, and/or tone mapper 1510.

Figure 17:
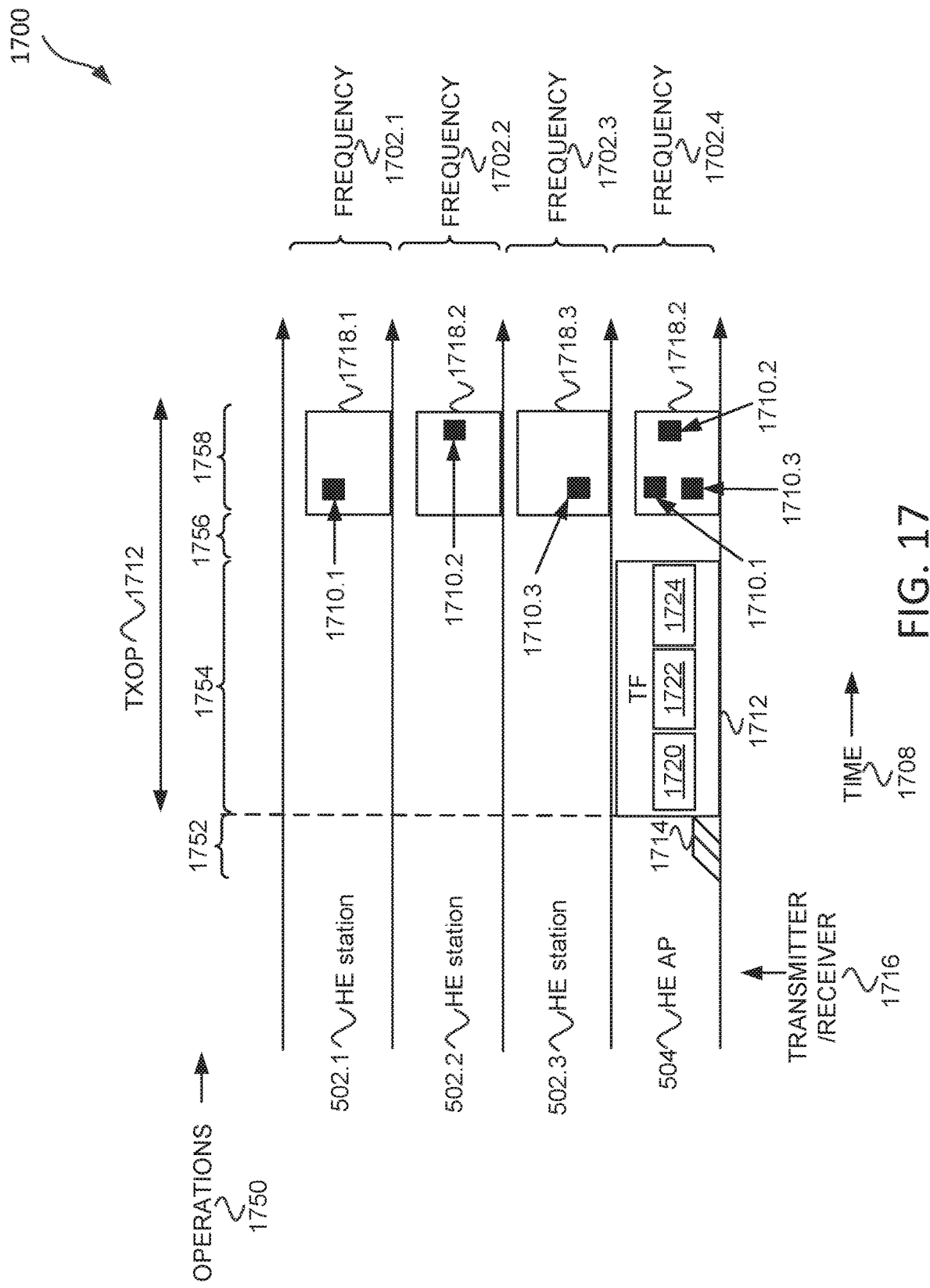
FIG. 17 illustrates a method for short feedback responses in accordance with some embodiments.

FIG. 17 illustrates a method 1700 for short feedback responses in accordance with some embodiments. Illustrated in FIG. 17 is time 1708 along a horizontal axis, transmitter/receiver 1716 along a vertical axis, frequency 1702 along a vertical axis, and operations 1750 along the top.

As illustrated, each of the frequencies 1702.1, 1702.2, 1702.3, and 1702.4 may be a same channel. For example, frequencies 1702 may be 20 MHz, 40 MHz, 80 MHz, 80+80 MHz, or 160 MHz. The method 1700 may begin at operation 1752 with the HE AP 502 acquiring the wireless medium 1714.

The method 1700 continues at operation 1754 with the HE AP 502 transmitting a trigger frame (TF) 1712. The TF 1712 may be a TF for short feedback. The TF 1712 may include a type 1720, a short feedback request 1722, and a mapping 1724 which includes RUs for the HE stations 502. The type 1720 may be a type that indicates short feedback. The short feedback request 1722 may be a request for information, e.g., whether the HE station 504 would like UL resources to send data to the HE AP 504, or whether the HE station 504 is available for a DL transmission from the HE AP 504. The mapping 1724 may include an indication of an RU (e.g., 808, 910, 1010, 1110, 1210, 1310, and 1410) for one or more of the HE stations 502 to use to transmit a short feedback response 1718 to the HE AP 504. The TF 1712 may include a duration that indicates a duration of the TXOP 1712. The HE station 502 receive and decode the TF 1712. In some embodiments, the mapping 1724 may be transmitted in a different packet, e.g., in an association packet, probe response packet, beacon frame, etc. The mapping 1724 may be a number that indicates a mapping that is shared between HE AP 504 and the HE station 504.

In some embodiments, the mapping 1724 may indicate a first pattern of encoding for a first short feedback response and a second pattern of encoding for a second short feedback response. For example, the pattern may include what to transmit on each of the tones of the RU (e.g., 808, 910), e.g., a positive signal, a negative signal, a carrier signal, no signal, a binary phase-shift keying (BPSK) signal, and a quadrature binary phase-shift keying (QBPSK) signal. In some embodiments, the mapping 1724 may include four or eight patterns.

The method 1700 continues at operation 1756 with the HE stations 502 waiting a duration. For example, the duration may be a short interframe space (SIFS).

The method 1700 continues at operation 1758 with the HE stations 502 transmitting short feedback responses 1718 on the RUs 1710 (e.g., 808, 910, 1010, 1110, 1210, 1310, and 1410). The short feedback response 1718 may include one or more bits of information. For example, HE stations 502 may transmit on an RU 808 where an orthogonal code or on-off code is transmitted over a duration of two or more symbols 810 (e.g., four symbols 810) and where the RU 808 is one or more tones. The orthogonal code or on-off code may convey additional information or further assist in the decoding of the short feedback response 178. The RUs 1710 are drawn as one square, but the RUs 1710 may include tones that are not contiguous, e.g., see RUs 808, 910, 1010, 1110, 1210, 1310, and 1410.

In another example, the HE stations 502 may transmit the short feedback response 1718 on an RU 910 that includes RBs 904 that are part of one or more symbols 906 where the RBs 904 includes one or more tones.

In another example, the HE stations 502 may transmit the short feedback response 1718 on an RU 1010 that includes RBs 1004 of tones that are interleaved in both frequency and time (e.g., with multiple symbols 1006) with other RBs 1004 of other HE stations 504.

In another example, the HE stations 502 may transmit the short feedback response 1718 on an RU 1110 that includes RBs 1104 of tones that are interleaved in both frequency and time (e.g., with multiple symbols 1106) with other RBs 1104 of other HE stations 504 where portions of the frequency 1102 are left unused.

In another example, the HE stations 502 may transmit the short feedback response 1718 on an RU 1210 that includes RBs 1204 of tones that are interleaved in both frequency and time (e.g., multiple symbols 1206) with other RBs 1204 of other HE stations 504 where portions of the frequency 1202 are left unused. The HE stations 504 may further mask two or more RBs 1204 with an orthogonal code (e.g., P-matrix) to either convey information (e.g., the selection of a row of the P-matrix may convey information) or to further enable the HE AP 502 to decode the short feedback response 1718.

In another example, the HE stations 502 may transmit the short feedback response 1718 on an RU 1310 that includes RBs 1304 of tones (e.g., odd tones 1321 and/or even tones 1320) that may be interleaved in frequency with other RBs 1304 of other HE stations 504. The RBs 1304 may include one or more tones and multiple symbols 1306. The HE stations 504 may mask two or more symbols 1306 of the RBs 1304 with an orthogonal code (e.g., P-matrix) to either convey information (e.g., the selection of a row of the P-matrix may convey information) or to further enable the HE AP 502 to decode the short feedback response 1718.

In another example, the HE stations 502 may transmit the short feedback response 1718 on an RU 1410 that includes RBs 1404 of tones (e.g., odd tones 1321 and/or even tones 1320) that, optionally, may be interleaved in frequency with other RBs 1304 of other HE stations 504. The RBs 1304 may include one or more tones and multiple symbols 1306. The HE stations 504 may mask two or more symbols 1306 of the RBs 1304 with an orthogonal code (e.g., P-matrix) or an on-off code to either convey information (e.g., the selection of a row of the P-matrix may convey information) or to further enable the HE AP 502 to decode the short feedback response 1718. The HE station 504 may further phase rotate tones of the RBs 1304 for a symbol 1406 duration as either BPSK or QBPSK to convey information or to further assist the HE AP 502 in decoding the short feedback response 1718.

RBs in the examples herein (e.g., FIGS. 8-17) may have symbols that are shorter than a symbol duration of the communication standard (e.g., IEEE 802.11ax), e.g., a symbol of 4 μs may be split into four different segments of 1 μs each for conveying information and/or increasing the ability of the HE AP 502 to decode the short feedback response 1718. For example, the on-off codes and/or orthogonal codes (e.g., P-matrix) may be used on the segments.

The HE stations 502 in the examples herein (e.g., FIGS. 8-17) may use an orthogonal code (e.g., P-matrix) or an on-off code in each of the examples, or the HE stations 502 may transmit to indicate a response and not transmit to indicate a second response.

In some embodiments, the HE stations 502 in the examples herein (e.g., FIGS. 8-17) may encode one or more data bits in the short feedback response 1718, e.g., by using orthogonal codes (e.g., P-matrix), by using on-off codes, by transmitting energy or not transmitting energy, and/or by rotating the phase of symbol or tone. Moreover, the RUs 1710 (e.g., 808, 910, 1010, 1110, 1210, 1310, and 1410) may include predetermined encodings. For example, a row of the P-matrix may indicate whether the HE station 504 would like UL resources.

The HE stations 504 may include a table that indicates the meaning of different encodings for the RUs 1710 (e.g., 808, 910, 1010, 1110, 1210, 1310, and 1410). In some embodiments, the RUs 1710 (e.g., 808, 910, 1010, 1110, 1210, 1310, and 1410) may be determined based on an AID of the HE stations 504. In some embodiments, RUs 1710 (e.g., 808, 910, 1010, 1110, 1210, 1310, and 1410) may be sent to the HE station 502 as part of the association process and/or in a request/response exchange between the HE station 504 and the HE AP 502.

The HE AP 502 receives and decodes the short feedback responses 1718 from the HE stations 504 and may use the short feedback responses 1718 to take further action. For example, the short feedback responses 1718 may be indications if the HE stations 504 would like UL resources to send data to the HE AP 502, and the HE AP 502 may use the short feedback responses 1718 to determine a second TF for an UL MU transmission for one or more of the HE stations 504. The method 1700 may be performed by a HE station 504, HE AP 502, an apparatus of a HE station 504, and/or an apparatus of a HE AP 502.

In some embodiments, the RUs 1710 (e.g., 808, 910, 1010, 1110, 1210, 1310, and 1410) are for direct encoding of the short feedback response 1718, e.g., the encoding process of FIG. 15 would not be used. In some embodiments, redundancy bits may be used in the short feedback response, e.g., one bit may be added for a cyclic redundancy check.

Figure 18:
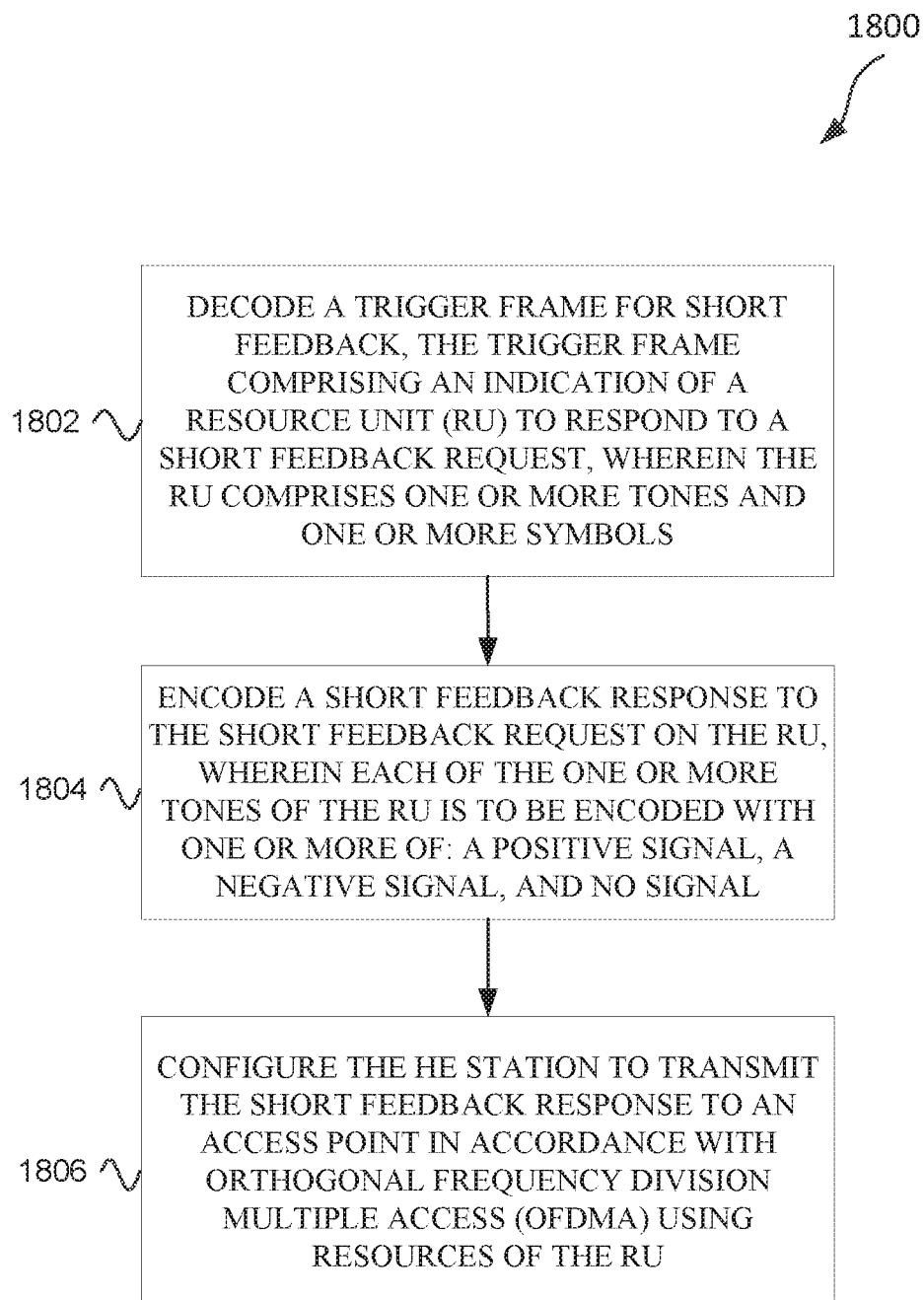
FIG. 18 illustrates a method for short feedback responses in accordance with some embodiments.

FIG. 18 illustrates a method 1800 for short feedback responses in accordance with some embodiments. The method 1800 begins with operation 1802 with decoding a trigger frame for short feedback, the trigger frame comprising an indication of a RU to respond to a short feedback request, wherein the RU comprises one or more tones and one or more symbols. For example, HE stations 502 of FIG. 17 may decode TF 1712.

The method 1800 optionally continues with determining a feedback response to the feedback request, wherein the feedback response comprises one or more bits of information. For example, the HE stations 504 of FIG. 17 may determine a response to the short feedback request 1722.

The method 1800 continues at operation 1804 with encoding a short feedback response to the short feedback request on the RU, wherein each of the one or more tones of the RU is to be encoded with one or more of: a positive signal, a negative signal, and no signal.

For example, the HE stations 502 of FIG. 17 may encode the short feedback response in accordance with the RU 1710 as disclosed in conjunction with FIG. 17 and in conjunction with FIGS. 8-17. In some embodiments, operation 1804 may be encoding a short feedback response to the short feedback request directly on the RU.

In some embodiments, the RU indicates a first pattern of encoding for a first short feedback response and a second pattern of encoding for a second short feedback response.

The method 1800 continues at operation 1806 with configure the HE station to transmit the short feedback response to an access point in accordance with orthogonal frequency division multiple access (OFDMA) using resources of the RU.

The method 1800 may be performed by a HE station 504, HE AP 502, an apparatus of a HE station 504, and/or an apparatus of a HE AP 502. One or more of the operations 1806 may be omitted and/or performed in a different order, in accordance with some embodiments.

Figure 19:
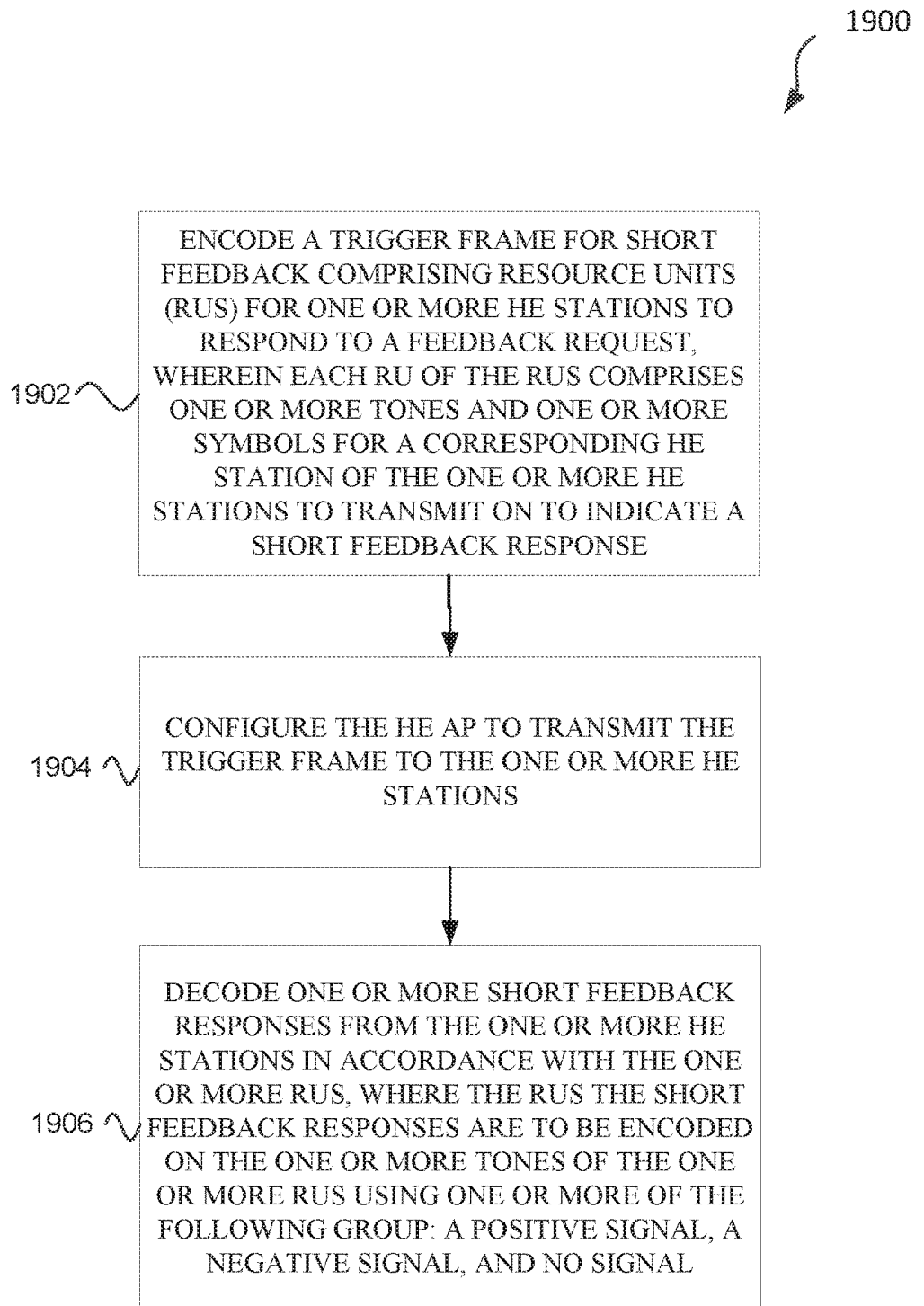
FIG. 19 illustrates a method for short feedback responses in accordance with some embodiments.

FIG. 19 illustrates a method 1900 for short feedback responses in accordance with some embodiments. The method 1900 begins at operation 1902 with encoding a trigger frame for short feedback comprising RUs for one or more HE stations to respond to a feedback request, wherein each RU of the RUs comprises one or more tones and one or more symbols for a corresponding HE station of the one or more HE stations to transmit on to indicate a short feedback response.

In some embodiments, operation 1902 may be encoding a trigger frame for short feedback comprising RUs for one or more HE stations to respond to a feedback request, wherein each RU of the RUs comprises one or more tones for a corresponding HE station of the one or more HE stations to transmit on to indicate a short feedback response. For example, HE AP 502 of FIG. 17 may encode TF 1712 with a short feedback request 1722 and a mapping 1724 which includes RUs for the HE stations 502. The RUs may be RUs 1710, 808, 910, 1010, 1110, 1210, 1310, and/or 1410 as disclosed in conjunction with FIGS. 8-17.

The method 1900 continues at operation 1904 with configuring the HE AP to transmit the trigger frame to the one or more HE stations.

For example, an apparatus of HE AP 502 of FIG. 17 may configure the HE AP 502 to transmit the TF 1712 to the HE stations 504.

The method 1900 continues at operation 1906 with decoding one or more short feedback responses from the one or more HE stations in accordance with the one or more RUs, where the RU indicate the short feedback responses are to be encoded on the one or more tones of the one or more RUs using one or more of the following group: a positive signal, a negative signal, and no signal. In some embodiments operation 1906 is decoding one or more short feedback responses from the one or more HE stations in accordance with the one or more RUs. For example, HE AP 502 may decode the short feedback responses 1718 in accordance with the RUs 1710 as disclosed in conjunction with FIG. 17. The method 1900 may be performed by a HE station 504, HE AP 502, an apparatus of a HE station 504, and/or an apparatus of a HE AP 502.

The following examples pertain to further embodiments. Specifics in the examples may be used in one or more embodiments. Example 1 is an apparatus of a high efficiency (HE) station, the apparatus including: memory; and processing circuitry couple to the memory, the processing circuitry configured to: decode a trigger frame for short feedback, the trigger frame including an indication of a resource unit (RU) to respond to a short feedback request, where the RU comprises one or more tones and one or more symbols; encode a short feedback response to the short feedback request on the RU, where each of the one or more tones of the RU is to be encoded with one or more of: a positive signal, a negative signal, and no signal; and configure the HE station to transmit the short feedback response to an access point in accordance with orthogonal frequency division multiple access (OFDMA) using resources of the RU.

In Example 2, the subject matter of Example 1 optionally includes where the RU comprises one or more orthogonal codes to be used to encode the short feedback response, and where the one or more orthogonal codes are to be used over a one or more symbol durations.

In Example 3, the subject matter of Example 2 optionally includes where a signal of the orthogonal codes has a duration that is less than or equal to half of a duration of one symbol of the one or more symbol duration, and where two or more signals of the orthogonal codes are to be transmitted during a duration of one symbol of the one or more symbol duration.

In Example 4, the subject matter of any one or more of Examples 1-3 optionally include where the short feedback response is to be encoded using different signals on a same tone during a duration of a symbol of the RU.

In Example 5, the subject matter of any one or more of Examples 1-4 optionally include where the trigger frame further comprises an indication of the short feedback request.

In Example 6, the subject matter of any one or more of Examples 1-5 optionally include where one RU is to be used to encode one bit of information.

In Example 7, the subject matter of any one or more of Examples 1-6 optionally include where the short feedback response is to be encoded on the one or more tones of the RU using one or more of the following group: a positive signal, a negative signal, a carrier signal, no signal, a binary phase-shift keying (BPSK) signal, and a quadrature binary phase-shift keying (QBPSK) signal.

In Example 8, the subject matter of any one or more of Examples 1-7 optionally includes where the one or more tones are part of a channel bandwidth having a predetermined number of tones, and where the channel bandwidth is one of the following group: a 20 MHz channel bandwidth, a 40 MHz bandwidth, an 80 MHz channel bandwidth, an 80+80 MHz bandwidth, and a 160 MHz bandwidth, and where the 20 MHz channel bandwidth comprises 242 tones, the 40 MHz channel bandwidth comprises 484 tones, the 80 MHz channel bandwidth comprises 996 tones, the 80+80 MHz bandwidth comprises 2×996 (1992) tones, and the 160 MHz bandwidth comprises 2×996 (1992) tones.

In Example 9, the subject matter of Example 8 optionally includes where the one or more tones is every x tones of the channel bandwidth.

In Example 10, the subject matter of Example 9 optionally includes where x is an integer number from 1 to 20.

In Example 11, the subject matter of any one or more of Examples 7-10 optionally include where every y tones of the channel bandwidth are not used for the RU or an RU of another HE station.

In Example 12, the subject matter of any one or more of Examples 1-11 optionally include where the RU further comprises one or more spatial streams.

In Example 13, the subject matter of any one or more of Examples 1-12 optionally include where the RU comprises one or more P-matrix codes to be used to encode the short feedback response.

In Example 14, the subject matter of any one or more of Examples 1-13 optionally include where the feedback request is an uplink (UL) resource allocation request.

In Example 15, the subject matter of any one or more of Examples 1-14 optionally include where the RU is part of a HE long training field (HE-LTF).

In Example 16, the subject matter of any one or more of Examples 1-15 optionally include where the memory is configured to store the trigger frame for short feedback and the short feedback response.

In Example 17, the subject matter of any one or more of Examples 1-16 optionally include transceiver circuitry coupled to the processing circuitry; and, one or more antennas coupled to the transceiver circuitry.

In Example 18, the subject matter of any one or more of Examples 1-17 optionally include where the RU indicates a first pattern of encoding for a first short feedback response and a second pattern of encoding for a second short feedback response.

Example 19 is a non-transitory computer-readable storage medium that stores instructions for execution by one or more processors, the instructions to configure the one or more processors to cause an apparatus of a high efficiency (HE) station to: decode a trigger frame for short feedback, the trigger frame including an indication of a resource unit (RU) to respond to a short feedback request, where the RU comprises one or more tones and one or more symbols; encode a short feedback response to the short feedback request on the RU, where each of the one or more tones of the RU is to be encoded with one or more of: a positive signal, a negative signal, and no signal; and configure the HE station to transmit the short feedback response to an access point in accordance with orthogonal frequency division multiple access (OFDMA) using resources of the RU.

In Example 20, the subject matter of Example 19 optionally includes where the short feedback response is to be encoded using different signals on a same tone during a duration of a symbol of the RU.

Example 21 is a method performed by an apparatus of a high efficiency (HE) station, the method including: decoding a trigger frame for short feedback, the trigger frame including an indication of a resource unit (RU) to respond to a short feedback request, where the RU comprises one or more tones and one or more symbols; encoding a short feedback response to the short feedback request on the RU, where each of the one or more tones of the RU is to be encoded with one or more of: a positive signal, a negative signal, and no signal; and configuring the HE station to transmit the short feedback response to an access point in accordance with orthogonal frequency division multiple access (OFDMA) using resources of the RU.

In Example 22, the subject matter of Example 21 optionally includes where the short feedback response is to be encoded using different signals on a same tone during a duration of a symbol of the RU.

Example 23 is an apparatus of a high efficiency (HE) access point (AP) including memory; and processing circuitry couple to the memory, the processing circuitry configured to: encode a trigger frame for short feedback including resource units (RUs) for one or more HE stations to respond to a feedback request, where each RU of the RUs comprises one or more tones and one or more symbols for a corresponding HE station of the one or more HE stations to transmit on to indicate a short feedback response; configure the HE AP to transmit the trigger frame to the one or more HE stations, and decode one or more short feedback responses from the one or more HE stations in accordance with the one or more RUs, where the RUs indicate the short feedback responses are to be encoded on the one or more tones of the one or more RUs using one or more of the following group: a positive signal, a negative signal, and no signal.

In Example 24, the subject matter of Example 23 optionally includes where the RUs comprise one or more orthogonal codes to be used to encode the short feedback responses, and where the one or more orthogonal codes are to be used over a one or more symbol duration.

In Example 25, the subject matter of any one or more of Examples 23-24 optionally include transceiver circuitry coupled to the processing circuitry; and, one or more antennas coupled to the transceiver circuitry.

Example 26 is an apparatus of a high efficiency (HE) station, the apparatus including: means for decoding a trigger frame for short feedback, the trigger frame including an indication of a resource unit (RU) to respond to a short feedback request, where the RU comprises one or more tones and one or more symbols; means for encoding a short feedback response to the short feedback request on the RU, where each of the one or more tones of the RU is to be encoded with one or more of: a positive signal, a negative signal, and no signal; and means for configuring the HE station to transmit the short feedback response to an access point in accordance with orthogonal frequency division multiple access (OFDMA) using resources of the RU.

In Example 27, the subject matter of Example 26 optionally includes where the RU comprises one or more orthogonal codes to be used to encode the short feedback response, and where the one or more orthogonal codes are to be used over a one or more symbol durations.

In Example 28, the subject matter of Example 27 optionally includes where a signal of the orthogonal codes has a duration that is less than or equal to half of a duration of one symbol of the one or more symbol duration, and where two or more signals of the orthogonal codes are to be transmitted during a duration of one symbol of the one or more symbol duration.

In Example 29, the subject matter of any one or more of Examples 26-28 optionally include where the short feedback response is to be encoded using different signals on a same tone during a duration of a symbol of the RU.

In Example 30, the subject matter of any one or more of Examples 26-29 optionally include where the trigger frame further comprises an indication of the short feedback request.

In Example 31, the subject matter of any one or more of Examples 26-30 optionally include where one RU is to be used to encode one bit of information.

In Example 32, the subject matter of any one or more of Examples 26-31 optionally include where the short feedback response is to be encoded on the one or more tones of the RU using one or more of the following group: a positive signal, a negative signal, a carrier signal, no signal, a binary phase-shift keying (BPSK) signal, and a quadrature binary phase-shift keying (QBPSK) signal.

In Example 33, the subject matter of any one or more of Examples 26-32 optionally where the one or more tones are part of a channel bandwidth having a predetermined number of tones, and where the channel bandwidth is one of the following group: a 20 MHz channel bandwidth, a 40 MHz bandwidth, an 80 MHz channel bandwidth, an 80+80 MHz bandwidth, and a 160 MHz bandwidth, and where the 20 MHz channel bandwidth comprises 242 tones, the 40 MHz channel bandwidth comprises 484 tones, the 80 MHz channel bandwidth comprises 996 tones, the 80+80 MHz bandwidth comprises 2×996 (1992) tones, and the 160 MHz bandwidth comprises 2×996 (1992) tones.

In Example 34, the subject matter of Example 33 optionally includes where the one or more tones is every x tones of the channel bandwidth.

In Example 35, the subject matter of Example 34 optionally includes

In Example 36, the subject matter of any one or more of Examples 34-35 optionally include where every y tones of the channel bandwidth are not used for the RU or an RU of another HE station.

In Example 37, the subject matter of any one or more of Examples 26-36 optionally include where the RU further comprises one or more spatial streams.

In Example 38, the subject matter of any one or more of Examples 26-37 optionally include where the RU comprises one or more P-matrix codes to be used to encode the short feedback response.

In Example 39, the subject matter of any one or more of Examples 26-38 optionally include where the feedback request is an uplink (UL) resource allocation request.

In Example 40, the subject matter of any one or more of Examples 26-39 optionally include where the RU is part of a HE long training field (HE-LTF).

In Example 41, the subject matter of any one or more of Examples 26-40 optionally include means for storing and retrieving the trigger frame for short feedback and the short feedback response.

In Example 42, the subject matter of any one or more of Examples 26-41 optionally include means for processing radio-frequency signals coupled to the apparatus; and, means for transmitting and receiving radio-frequency signals coupled to the means for processing radio-frequency signals.

In Example 43, the subject matter of any one or more of Examples 26-42 optionally include where the RU indicates a first pattern of encoding for a first short feedback response and a second pattern of encoding for a second short feedback response.

Example 44 is a non-transitory computer-readable storage medium that stores instructions for execution by one or more processors, the instructions to configure the one or more processors to cause an apparatus of a high efficiency (HE) access point (HE AP) to: encode a trigger frame for short feedback including resource units (RUs) for one or more HE stations to respond to a feedback request, where each RU of the RUs comprises one or more tones and one or more symbols for a corresponding HE station of the one or more HE stations to transmit on to indicate a short feedback response; configure the HE AP to transmit the trigger frame to the one or more HE stations; and decode one or more short feedback responses from the one or more HE stations in accordance with the one or more RUs, where the RUs indicate the short feedback responses are to be encoded on the one or more tones of the one or more RUs using one or more of the following group: a positive signal, a negative signal, and no signal.

In Example 45, the subject matter of Example 44 optionally includes where the RUs comprise one or more orthogonal codes to be used to encode the short feedback responses, and where the one or more orthogonal codes are to be used over a one or more symbol duration.

In Example 46, the subject matter of any one or more of Examples 44-45 optionally include transceiver circuitry coupled to the processing circuitry; and, one or more antennas coupled to the transceiver circuitry.

Example 47 is a method performed by a high efficiency (HE) access point (HE AP) to: encoding a trigger frame for short feedback including resource units (RUs) for one or more HE stations to respond to a feedback request, where each RU of the RUs comprises one or more tones and one or more symbols for a corresponding HE station of the one or more HE stations to transmit on to indicate a short feedback response; configuring the HE AP to transmit the trigger frame to the one or more HE stations; and decoding one or more short feedback responses from the one or more HE stations in accordance with the one or more RUs, where the RUs indicate the short feedback responses are to be encoded on the one or more tones of the one or more RUs using one or more of the following group: a positive signal, a negative signal, and no signal.

In Example 48, the subject matter of Example 47 optionally includes where the RUs comprise one or more orthogonal codes to be used to encode the short feedback responses, and where the one or more orthogonal codes are to be used over a one or more symbol duration.

Example 49 is an apparatus of a high efficiency (HE) access point (HE AP) to: means for encoding a trigger frame for short feedback including resource units (RUs) for one or more HE stations to respond to a feedback request, where each RU of the RUs comprises one or more tones and one or more symbols for a corresponding HE station of the one or more HE stations to transmit on to indicate a short feedback response; means for configuring the HE AP to transmit the trigger frame to the one or more HE stations; and means for decoding one or more short feedback responses from the one or more HE stations in accordance with the one or more RUs, where the RUs indicate the short feedback responses are to be encoded on the one or more tones of the one or more RUs using one or more of the following group: a positive signal, a negative signal, and no signal.

In Example 50, the subject matter of Example 49 optionally includes where the RUs comprise one or more orthogonal codes to be used to encode the short feedback responses, and where the one or more orthogonal codes are to be used over a one or more symbol duration.

The Abstract is provided to comply with 37 C.F.R Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high efficiency (HE) station (STA), the apparatus comprising: memory; and processing circuitry coupled to the memory, the processing circuitry configured to:
    decode a trigger frame from a HE access point (AP), the trigger frame comprising a trigger type subfield, the trigger type subfield indicating a feedback report poll trigger type, a feedback type subfield, the feedback type subfield indicating a resource request feedback type, and an association identification (AID);
    determine a resource unit (RU) for the HE STA to transmit feedback to the HE AP based on the AID, wherein the RU comprises a set of subcarriers of a HE long-training field (LTF)(HE-LTF) of a physical layer (PHY) protocol data unit (PPDU);
    encode a feedback response in accordance with the resource request feedback type for transmission on the set of subcarriers indicated by the RU; and
    configure the HE STA to transmit the PPDU comprising the HE-LTF.

2. The apparatus of claim 1, wherein the set of subcarriers comprises a first set of subcarriers for indicating a first response and a second set of subcarriers to indicate a second response, and wherein to encode the feedback response, the processing circuitry is further configured to:
    encode the feedback response on the first set of subcarriers to indicate the first response or on the second set of subcarriers to indicate the second response.

3. The apparatus of claim 2, wherein the first response is a 0 and the second response is a 1.

4. The apparatus of claim 2, wherein the first set of subcarriers and the second set of subcarriers each comprise a plurality of subcarriers of the HE-LTF spaced in accordance with a pattern.

5. The apparatus of claim 1, wherein the trigger frame further comprises a bandwidth subfield indicating a bandwidth for the PPDU, wherein the bandwidth is one from the following group: 20 MHz, 40 MHz, 80 MHz, 80+80 MHz, and 160 MHz, and wherein configure the HE STA to transmit the PPDU further comprises:
    configure the HE STA to transmit the PPDU comprising the HE-LTF in accordance with the bandwidth.

6. The apparatus of claim 1, wherein encode the feedback response in accordance with the resource request feedback type on the set of subcarriers indicated by the RU further comprises:
    encode the feedback response to indicate whether the HE STA requests uplink resources.

7. The apparatus of claim 1, wherein a bandwidth for the PPDU indicates a predetermined number of subcarriers, the predetermined number of subcarriers comprising the set of subcarriers.

8. The apparatus of claim 1, wherein the processing circuitry is further configured to:
    determine the set of subcarriers indicated by the RU based on the AID.

9. The apparatus of claim 1, wherein subcarriers of the set of subcarriers are not contiguous.

10. The apparatus of claim 1, wherein subcarriers of the set of subcarriers are encoded as a 1 or a −1.

11. The apparatus of claim 1 further comprising: mixer circuitry to downconvert RF signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals including the trigger frame.

12. The apparatus of claim 1 further comprising: mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the trigger frame.

13. The apparatus of claim 1, further comprising: transceiver circuitry coupled to the processing circuitry; and, one or more antennas coupled to the transceiver circuitry, and wherein the memory is configured to store the AID.

14. A non-transitory computer-readable storage medium that stores instructions for execution by one or more processors of a high efficiency (HE) station (STA), the instructions to configure the one or more processors to:
    decode a trigger frame from a HE access point (AP), the trigger frame comprising a trigger type subfield, the trigger type subfield indicating a feedback report poll trigger type, a feedback type subfield, the feedback type subfield indicating a resource request feedback type, and an association identification (AID);
    determine a resource unit (RU) for the HE STA to transmit feedback to the HE AP based on the AID, wherein the RU comprises a set of subcarriers of a HE long-training field (LTF)(HE-LTF) of a physical layer (PHY) protocol data unit (PPDU);

encode a feedback response in accordance with the resource request feedback type for transmission on the set of subcarriers indicated by the RU; and configure the HE STA to transmit the PPDU comprising the HE-LTF.

15. The non-transitory computer-readable storage medium of claim 14, wherein the set of subcarriers comprises a first set of subcarriers for indicating a first response and a second set of subcarriers to indicate a second response, and wherein the encode the feedback response further comprises:

encode the feedback response on the first set of subcarriers to indicate the first response or on the second set of subcarriers to indicate the second response.

16. The non-transitory computer-readable storage medium of claim 14, wherein the first set of subcarriers and the second set of subcarriers each comprise a plurality of subcarriers of the HE-LTF spaced in accordance with a pattern.

17. An apparatus of a high efficiency (HE) access point (AP), the apparatus comprising: memory; and processing circuitry couple to the memory, the processing circuitry configured to:

encode a trigger frame for a HE stations (STAs), the trigger frame comprising a trigger type subfield, the trigger type subfield indicating a feedback report poll trigger type, a feedback type subfield, the feedback type subfield indicating a resource request feedback type, and an association identification (AID), the AID indicating resource units (RUs) for the HE STAs to transmit feedback to the HE AP, wherein the RUs indicate sets of subcarriers of HE long-training fields (LTF)(HE-LTFs) of physical layer (PHY) protocol data unit (PPDUs), and refrain from encoding RU fields;

configure the HE AP to transmit the trigger frame to the HE STAs; and decode feedback responses from the HE STAs in accordance with the resource request feedback type on corresponding sets of subcarriers indicated by the RUs.

18. The apparatus of claim 17, wherein the sets of subcarriers comprise first sets of subcarriers for indicating a first response and second sets of subcarriers for indicating a second response, and wherein the decode the feedback responses further comprises:

decode the feedback responses on the first sets of subcarriers and on the second sets of subcarriers.

19. The apparatus of claim 18, wherein the first response is a 0 and the second response is a 1.

20. The apparatus of claim 17, further comprising: transceiver circuitry coupled to the processing circuitry; and, one or more antennas coupled to the transceiver circuitry.

* * * * *